United States Patent
Ishihara et al.

(10) Patent No.: US 9,514,382 B2
(45) Date of Patent: Dec. 6, 2016

(54) IMAGE PROCESSING APPARATUS AND IMAGE PROCESSING METHOD

(71) Applicant: FUJITSU LIMITED, Kawasaki-shi, Kanagawa (JP)

(72) Inventors: Masaki Ishihara, Kawasaki (JP); Masahiko Sugimura, Kawasaki (JP); Susumu Endo, Kawasaki (JP); Takayuki Baba, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 14/341,320

(22) Filed: Jul. 25, 2014

(65) Prior Publication Data
US 2015/0063651 A1 Mar. 5, 2015

(30) Foreign Application Priority Data

Aug. 28, 2013 (JP) .................................. 2013-176217

(51) Int. Cl.
*G06T 7/00* (2006.01)
*G06K 9/48* (2006.01)
(Continued)

(52) U.S. Cl.
CPC . *G06K 9/48* (2013.01); *G06K 9/34* (2013.01); *G06T 7/0081* (2013.01);
(Continued)

(58) Field of Classification Search
CPC ........ G06K 2209/17; G06K 9/34; G06K 9/48; G06T 2207/20148; G06T 2207/30128; G06T 7/0081; G06T 7/0083; G06T 7/602
See application file for complete search history.

(56) References Cited

U.S. PATENT DOCUMENTS 5,471,535 A * 11/1995 Ikezawa ................ G06T 7/0083
356/601
5,768,412 A * 6/1998 Mitsuyama ........ G06K 9/00127
382/133

(Continued)

FOREIGN PATENT DOCUMENTS

JP 07-200774 8/1995
JP 2001-344607 12/2001

OTHER PUBLICATIONS

D.K.L. Mackerron et al., "Decision Support Systems in Potato Production: Bringing Models to Practice", Marshall, et al., "Automated on-farm assessment of tuber size distribution", Wageningen Academic Publishers, pp. 101-116 (Jun. 30, 2004).

(Continued)

*Primary Examiner* — Siamak Harandi
*Assistant Examiner* — Ian Lemieux
(74) *Attorney, Agent, or Firm* — Fujitsu Patent Center

(57) ABSTRACT

A binarization processing unit generates a binary image by comparing the visual feature of each pixel of an input image with a predetermined binarization threshold and binarizing the value of each pixel of the input image based on the comparison result. The binarization processing unit performs this process while changing the binarization threshold, thereby generating a plurality of binary images. A contour detecting unit calculates the area of a closed region having an overlap between the plurality of binary images, and determines the binarization threshold to be used for detecting a boundary of the corresponding closed region as a contour of an object, based on the area change rate of the corresponding closed region caused by changing the binarization threshold.

15 Claims, 15 Drawing Sheets

(51) Int. Cl.
*G06T 7/60* (2006.01)
*G06K 9/34* (2006.01)

(52) U.S. Cl.
CPC ............ *G06T 7/0083* (2013.01); *G06T 7/602* (2013.01); *G06K 2209/17* (2013.01); *G06T 2207/20148* (2013.01); *G06T 2207/30128* (2013.01)

(56) References Cited

U.S. PATENT DOCUMENTS

| | | | | |
|---|---|---|---|---|
| 5,920,655 | A * | 7/1999 | Makita | G06K 9/38 382/270 |
| 8,160,296 | B2 * | 4/2012 | O'Hara | G06T 7/0081 348/140 |
| 2012/0033862 | A1 * | 2/2012 | Wang | G06K 9/6256 382/128 |
| 2014/0133761 | A1 * | 5/2014 | Hikida | G06K 9/4604 382/199 |

OTHER PUBLICATIONS

Hashimoto et al., "Let's make a display that detects touch of a hand or an object by using Web camera", Appendix B of "Learning OpenCV—Image processing and recognition using computer vision library", pp. 555-564 (Aug. 24, 2009).

Kota Aoki, "Research on statistical image processing by random field and its application to region segmentation", Dissertation, Tokyo Institute of Technology, pp. 5-17 (Mar. 26, 2006).

Shinichi Murakami, "Image Processing Engineering", Tokyo Denki University Press, pp. 39-40 (Oct. 20, 2004).

* cited by examiner

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2013-176217, filed on Aug. 28, 2013, the entire contents of which are incorporated herein by reference.

FIELD

The embodiments discussed herein are related to an image processing apparatus and an image processing method.

BACKGROUND

It is ideal for agricultural producers to predict the harvest time and yield of agricultural products in an early stage in order to achieve the delivery time and amount that are specified in advance in the contract with the purchaser of agricultural products. One way to make such harvest predictions is to regularly check the weight distribution of agricultural products during their growth. The weight distribution is a frequency distribution obtained by measuring the weight of each agricultural product and represented by a graph with the weight on the horizontal axis and the number of agricultural products on the vertical axis. However, for making such harvest predictions, the weights of a large number of agricultural products need to be measured individually.

In view of this problem, there has been proposed a method that calculates the area of each potato based on an image of harvested potatoes captured by a digital camera, and estimates the weight of each potato on the basis of the calculated area. The area of each potato may be calculated based on the contour of each potato captured in the image.

Further, as a method for extracting the contour of an object, such as an agricultural product or the like, from a captured image, there has been a method of binarizing an image by comparing the visual feature of each pixel that is based on the captured image with a threshold. This visual feature may be, for example, data of a histogram image obtained by back-projecting the histogram of pixel values in a captured image.

Further, as a technique related to contour detection, there has been a technique that extracts contour points of ellipses from an input image, estimates the parameter of the ellipse for each contour point, and repeats processing for updating the parameter to a value that is consistent between the contour points. Then, the overlapping ellipses are separated, and the parameters are calculated.

Examples of the related art are disclosed in:
Japanese Laid-open Patent Publication No. 7-200774;
Japanese Laid-open Patent Publication No. 2001-344607;
Bruce Marshall, Mark W. Young, "Automated on-farm assessment of tuber size distribution", Decision Support Systems in Potato Production: Bringing Models to Practice, Wageningen Pers, Jun. 30, 2004, pp. 101-117; and
Gary Bradski, Adrian Kaehler, "Learning OpenCV", O'Reilly Japan, Inc., Aug. 24, 2009, pp. 561-562.

In order to calculate the area of each agricultural product based on an image representing a large number of agricultural products such as potatoes or the like, and thus to estimate the weight of each agricultural product based on the area, the contour of each agricultural product needs to be detected. It is assumed that, for this contour detection, the above-described method is used that binarizes an image by comparing the visual feature of each pixel that is based on the captured image with a threshold.

With this method, in the case where a plurality of objects, such as agricultural products, having similar appearances are adjacent to each other in an image, depending on the value of the threshold, there might be a problem that the contours of the adjacent objects are connected, or there might be a problem that the contour is detected inside the actual contour, resulting in an inward shift of the contour. It is difficult to solve these two problems at once. For example, if a single threshold is used, the contours of adjacent objects might be connected in one location, while there might be an inward shift of the contour in another location.

SUMMARY

According to one embodiment, there is provided an image processing apparatus that includes a processor configured to perform a procedure including: generating a plurality of binary images by performing a binary image generation process while changing a predetermined binarization threshold, the binary image generation process being a process of generating a binary image by comparing a visual feature of each pixel of an image representing a plurality of objects with the binarization threshold and binarizing a value of each pixel of the image based on a result of the comparing; calculating an area of a corresponding closed region, the corresponding closed region being a closed region represented in each of the plurality of binary images and having an overlap between the plurality of binary images; and determining the binarization threshold to be used for detecting a boundary of the corresponding closed region as a contour of an object, based on an area change rate of the corresponding closed region caused by changing the binarization threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
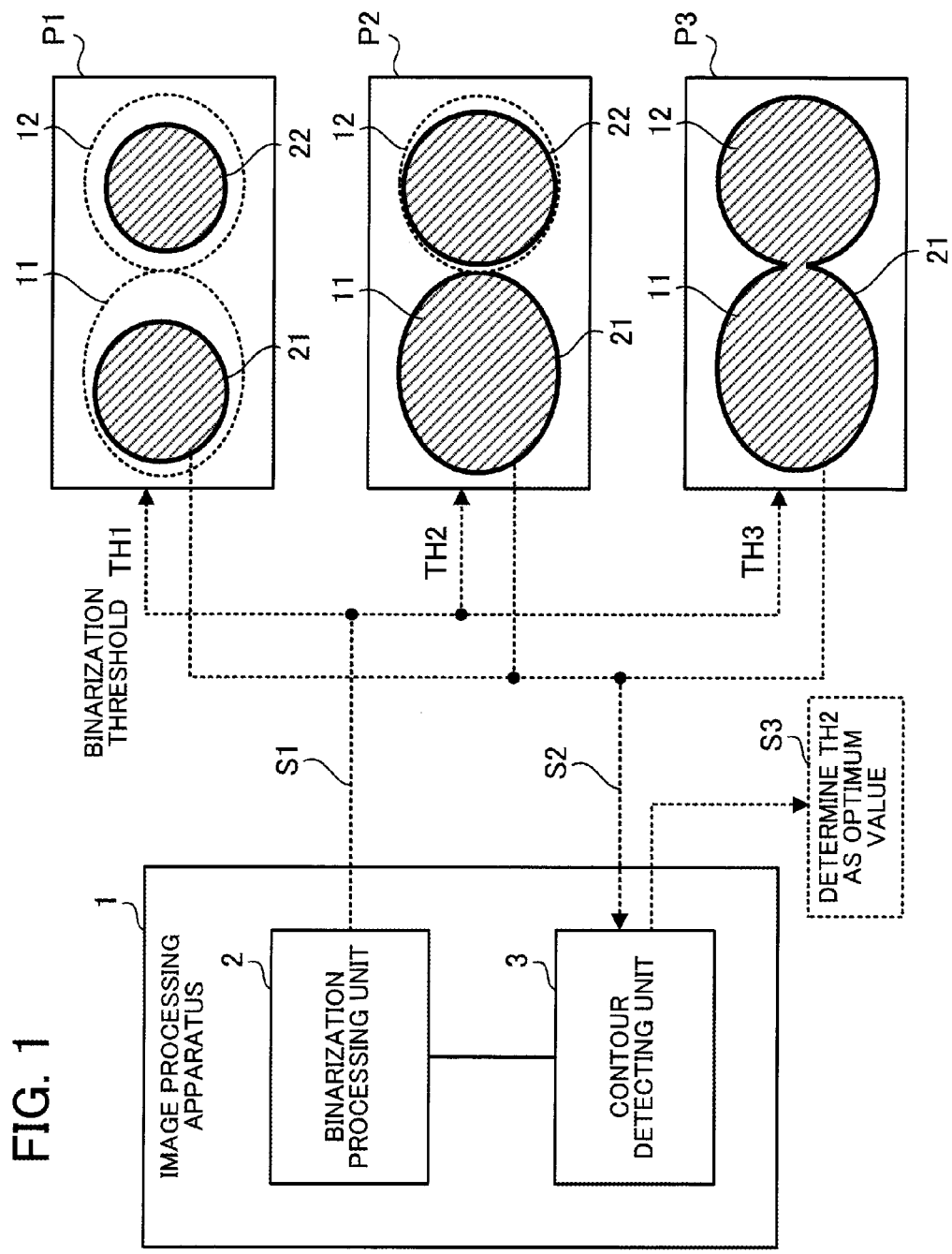
FIG. 1 illustrates an exemplary configuration of an image processing apparatus and an exemplary process according to a first embodiment.

Several embodiments will be described below with reference to the accompanying drawings, wherein like reference numerals refer to like elements throughout.

(a) First Embodiment

FIG. 1 illustrates an exemplary configuration of an image processing apparatus 1 and an exemplary process according to a first embodiment. The image processing apparatus 1 performs a process for detecting, from an input image representing a plurality of objects, the contour of each of the object. In particular, the image processing apparatus 1 is capable of accurately detecting the contour of an object even if the object is in contact with another object therearound.

The image processing apparatus 1 includes a binarization processing unit 2 and a contour detecting unit 3. Operations by the binarization processing unit 2 and the contour detecting unit 3 are realized when, for example, a processor (not illustrated) of the image processing apparatus 1 executes a predetermined program.

The binarization processing unit 2 generates a binary image by comparing the visual feature of each pixel of the input image with a predetermined binarization threshold and binarizing the value of each pixel of the input image based on the comparison result. Further, the binarization processing unit 2 performs this binary image generation process while changing the binarization threshold, thereby generating a plurality of binary images.

As the visual feature, luminance information or color information based on the pixel values of the input image may be used. In another example, the following method may be used. The binarization processing unit 2 calculates the frequency density of luminance information, color information, or the like, which are based on the pixel values, in the input image, and performs a back projection of the calculated frequency density onto the respective pixels of the input image. Thus, the binarization processing unit 2 generates a visual feature image. As the above-described visual feature, the pixel values (frequency density) of such a visual feature image may also be used.

The contour detecting unit 3 calculates the area of a corresponding closed region, which is a closed region represented in each of the plurality of binary images and having an overlap between the plurality of binary images. Then, the contour detecting unit 3 determines a binarization threshold to be used for detecting the boundary of the corresponding closed region as the contour of an object, based on the area change rate of the corresponding closed region caused by changing the binarization threshold.

By detecting the boundary of the corresponding closed region that is formed using the determined binarization threshold as the contour of an object, the contour of the object is accurately detected. Further, the above process is performed for each of a plurality of corresponding closed regions represented in each binary image, so that the boundary of each of a plurality of objects represented in the input image is accurately detected.

The following describes an example of a process for detecting the contour of an object. In this exemplary process, there are objects 11 and 12 that are adjacent to and in contact with each other in an input image. Then, the contour of the object 11 is detected as described below.

The binarization processing unit 2 generates binary images P1, P2, and P3, using binarization thresholds TH1, TH2, and TH3, respectively (step S1). Note that, in the binary images P1 through P3 of FIG. 1, hatched regions are regions with one pixel value (for example, a value "1"), while the regions other than the hatched regions are regions with the other pixel value (for example, a value "0").

In this exemplary process, when the binarization threshold TH1 is used, closed regions 21 and 22 appear in the binary image P1. In the binary image P1, the closed region 21 is located inside the contour of the object 11, and the closed region 22 is located inside the contour of the object 12.

Further, when the binarization threshold is changed from TH1 to TH2, and then to TH3, the closed region 21 is gradually enlarged. In the binary image P2, the contour of the closed region 21 substantially matches the contour of the object 11. In the binary image P3, the closed region 21 is connected to the closed region 22, and thus expands to include the region defined by the contour of the object 12.

Note that the closed regions 21 in the binary images P1 through P3 are the above-mentioned "corresponding closed regions" having an overlap.

The contour detecting unit 3 calculates the area of the closed region 21 in each of the binary images P1 through P3 (step S2). Then, the contour detecting unit 3 determines an optimum value of a binarization threshold to be used for detecting the boundary of the closed region 21 as the contour of the object 11, based on the area change rate of the closed region 21.

When the binarization threshold is changed from TH1 to TH2, the closed region 21 expands within the contour of the object 11. On the other hand, when the binarization threshold is changed from TH2 to TH3, the closed region 21 is connected to the other closed region 22. Therefore, when the binarization threshold is changed from TH2 to TH3, the area change rate of the closed region 21 increases sharply.

In this case, the contour of the closed region 21 in the binary image P2 that is generated immediately before changing the binarization threshold to TH3 is estimated to be the closest to the contour of the corresponding object 11. Accordingly, upon detecting a sharp increase in the area change rate of the closed region 21, the contour detecting unit 3 determines, as an optimum value of the binarization threshold, the binarization threshold TH2 used for generating the binary image P2 immediately before a sharp expansion of the closed region 21.

The boundary of the closed region 21 in the binary image P2 that is generated using the binarization threshold TH2 is output as the contour of the corresponding object 11. Thus, it is possible to accurately detect the contour of the object 11.

Further, the image processing apparatus 1 may determine an optimum value of a binarization threshold for the closed region 22 based on the area change rate of the closed region 22, using the same procedure as that described above. Thus, it is possible to accurately detect the contour of the object 12 as well.

(b) Second Embodiment

Figure 2:
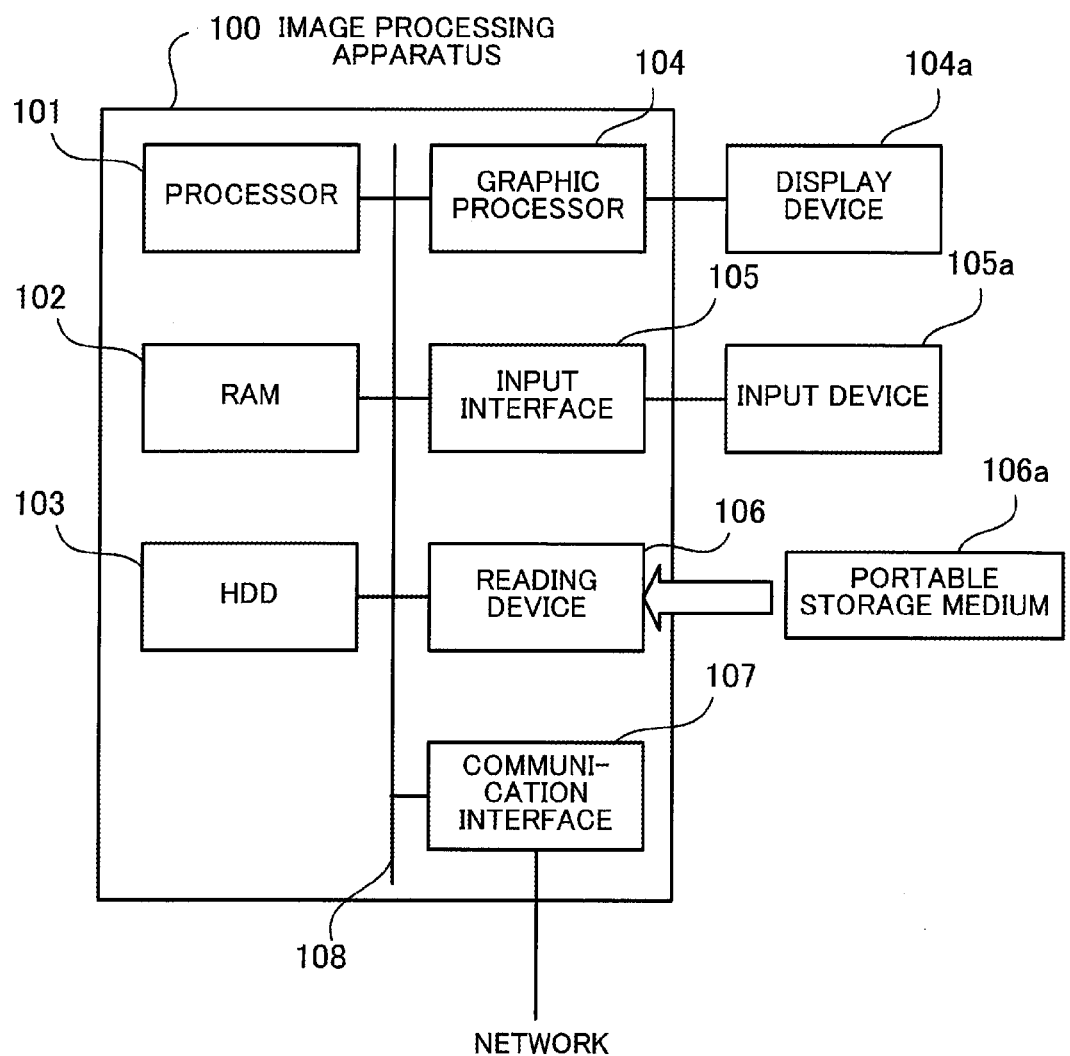
FIG. 2 illustrates an exemplary hardware configuration of an image processing apparatus according to a second embodiment.

FIG. 2 illustrates an exemplary hardware configuration of an image processing apparatus 100 according to a second embodiment. The image processing apparatus 100 is implemented, for example, as a computer illustrated in FIG. 2.

The entire operation of the image processing apparatus 100 is controlled by a processor 101. The processor 101 may be a multiprocessor. Examples of the processor 101 include central processing unit (CPU), micro processing unit (MPU), digital signal processor (DSP), application specific integrated circuit (ASIC), and programmable logic device (PLD). Alternatively, the processor 101 may be a combination of two or more of the devices selected from CPU, MPU, DSP, ASIC, and PLD.

A random access memory (RAM) 102 and a plurality of peripheral devices are connected to the processor 101 via a bus 108.

The RAM 102 is used as a primary storage device of the image processing apparatus 100. The RAM 102 temporarily stores at least part of the operating system (OS) program and application programs that are executed by the processor 101. The RAM 102 also stores various types of data used for processing performed by the processor 101.

The peripheral devices connected to the bus 108 include a hard disk drive (HDD) 103, a graphic processor 104, an input interface 105, a reading device 106, and a communication interface 107.

The HDD 103 is used as a secondary storage device of the image processing apparatus 100. The HDD 103 stores the OS program, application programs, and various types of data. Note that other types of non-volatile storage devices such as SSD (Solid State Drive) and the like may be used as a secondary storage device.

A display device 104a is connected to the graphic processor 104. The graphic processor 104 displays images on the screen of the display device 104a in accordance with a command from the processor 101. Examples of the display device 104a include display devices using a cathode ray tube (CRT), liquid crystal display devices, and the like.

An input device 105a is connected to the input interface 105. The input interface 105 receives signals from the input device 105a, and transmits the received signals to the processor 101. Examples of the input device 105a include keyboards, pointing devices, and the like. Examples of pointing devices include mice, touch panels, tablets, touch pads, track balls, and the like.

A portable storage medium 106a is inserted into or removed from the reading device 106. The reading device 106 reads data stored in the portable storage medium 106a, and transmits the read data to the processor 101. Examples of portable storage medium 106a include optical discs, magneto-optical disks, semiconductor memory devices, and the like.

The communication interface 107 exchanges data with other apparatuses via a network.

With the hardware configuration described above, it is possible to realize the processing functions of the image processing apparatus 100.

The above-described image processing apparatus 100 receives an input of image data of a captured image captured by an external imaging apparatus and representing a plurality of objects, and performs processing on the image data. The imaging apparatus may be, for example, any commercially available digital still camera. The image data is input to the image processing apparatus 100, for example, via the portable storage medium 106a or via the communication interface 107 from another apparatus on the network. The input image data is stored, for example, in the HDD 103.

In this embodiment, it is assumed that objects represented in the captured image are agricultural products of the same type, such as potatoes or the like, for example. However, in the process for detecting the contours of individual objects described below, the individual objects as detection targets are not actually limited to agricultural products. The objects may be any objects that have a certain degree of commonality, for example, in the visual feature that is determined from image data of an image representing the objects. Such visual feature may be color information. Further, as for the shape of the object, the surface at the side to be imaged preferably has a curved shape.

In an example, the image processing apparatus 100 is implemented as a terminal computer (for example, a personal computer or the like) operated by an agricultural producer. In another example, the image processing apparatus 100 may be implemented as a server apparatus connected to a wide area network such as the Internet or the like. In the latter example, the agricultural producer transmits data of a captured image representing agricultural products from a terminal apparatus to a cloud server via the network, and requests execution of processes described below, such as detection of the contours of the agricultural products and weight estimation.

Figure 3:
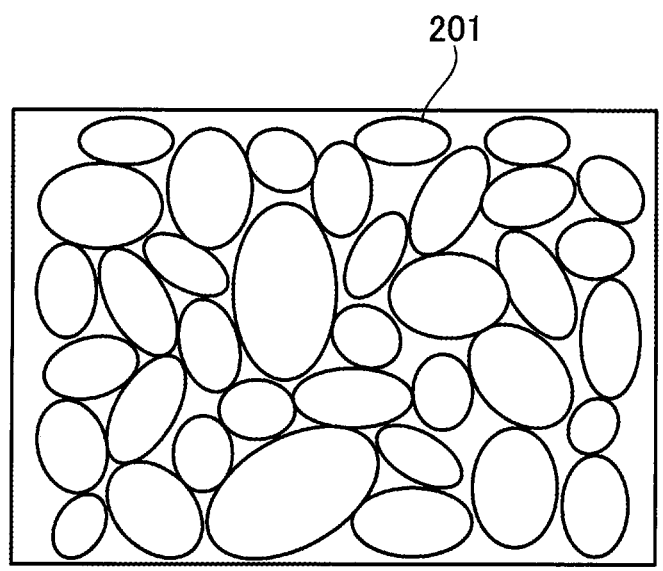
FIG. 3 illustrates an example of a captured image representing a plurality of objects.

FIG. 3 illustrates an example of a captured image representing a plurality of objects 201. The objects 201 represented in the captured image of FIG. 3 are potatoes, for example. The objects 201 are arranged flat so as not to overlap in the vertical direction (that is, the front-back direction as viewed from the imaging apparatus). This image may be obtained by capturing an image of a large number of agricultural products placed at the bottom of a basket, from the upper side of the basket, for example.

The image processing apparatus 100 extracts the contour of each object 201 from the captured image of FIG. 3. Further, the image processing apparatus 100 calculates the area of each object 201 in the captured image, based on the extracted contour. If the objects 201 are agricultural products, the weight of each object 201 may be estimated, based on the area of each object 201 calculated using the technique disclosed in the above-mentioned reference "Automated on-farm assessment of tuber size distribution" and the like.

For example, the agricultural producer harvests a large number of agricultural products during their growth, and captures an image of the agricultural products in a manner illustrated in FIG. 3. If it is possible to estimate the weight of each of the agricultural products from the captured image and to calculate the weight distribution of the agricultural products using the image processing apparatus 100, the agricultural producer becomes able to easily predict the harvest time and yield of agricultural products.

In this embodiment, the image processing apparatus 100 uses, as a method of detecting the contour of each object 201, a method that binarizes an image by comparing the visual feature of each pixel that is based on the captured image with a threshold and separates the region of each of the objects 201 from their background region is used. Further, as the visual feature, the pixel values (that is, the frequencies) of a grayscale image obtained by back-projecting the histogram of the visual feature of each pixel based on a captured image are used.

The contour detection method using a back projection of a histogram is known as a method capable of more accurately detecting the contours of objects, such as agricultural products, that have similar visual features such as outer shape, color, pattern, and the like, but are non-uniform and have irregular shapes, compared to a model fitting method that uses a model of a detection target object, for example.

The following describes the overview of the contour detection process using a back projection of a histogram, and problems therewith.

Figure 4:
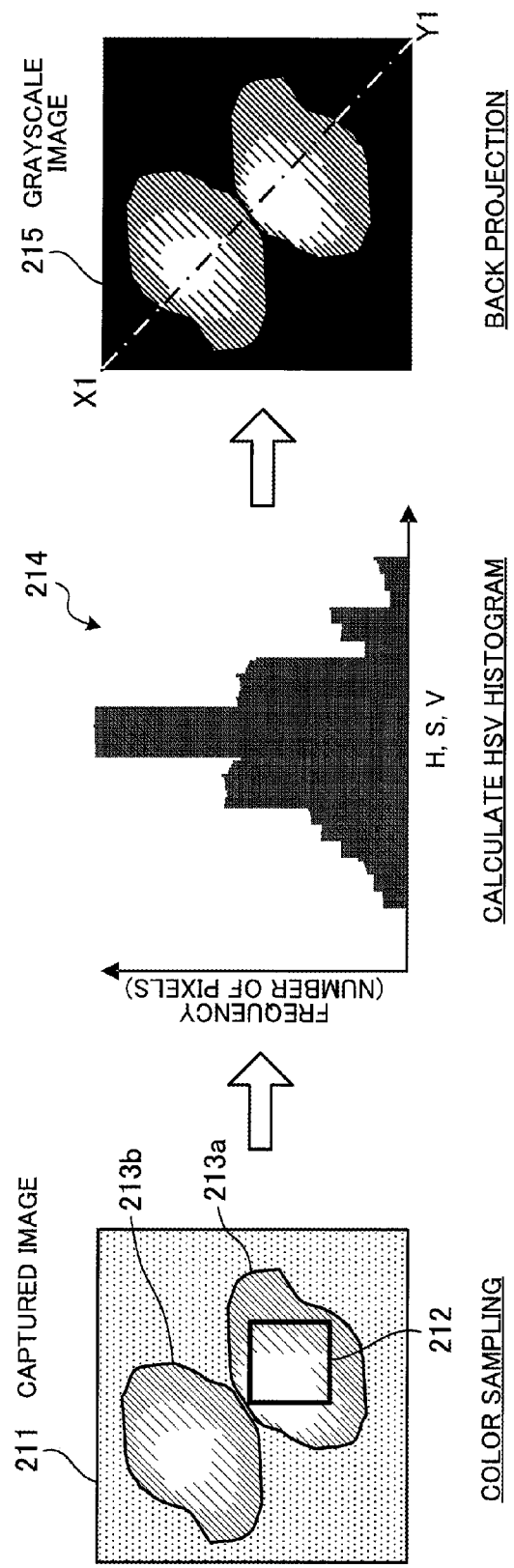
FIG. 4 illustrates an exemplary process for generating a grayscale image by back projection of a histogram.

FIG. 4 illustrates an exemplary process for generating a grayscale image by back projection of a histogram. As illustrated in FIG. 4, a grayscale image is generated by, for example, performing color sampling from a captured image 211, calculation of a histogram, and back projection of the histogram.

In color sampling, a sampling region 212 is specified in a region in which a detection target object is present, in the captured image 211 to be processed. The sampling region 212 may be set, for example, by an input from the operator who sees the captured image 211 on the display device 104a. Alternatively, the image processing apparatus 100 may automatically detect, from the captured image 211, a continuous region whose values of color information are within a certain threshold range for identifying a detection target object.

In the example of FIG. 4, the sampling region 212 is set in one of the regions of two objects 213a and 213b included in the captured image 211. However, the sampling region 212 may be set in each of the regions of two or more objects.

In color sampling, the pixel values in the set sampling region 212 are sampled, and a histogram is calculated based on the sampled pixel values. In the example of FIG. 4, a histogram (hereinafter referred to as an "HSV histogram") 214 of hue (H), saturation (S), and value (V) is calculated. Note that although the HSV histogram 214 is drawn in two dimensions in FIG. 4, the HSV histogram 214 is actually a graph with four axes of H, S, V and frequency (the number of pixels).

Note that the histogram is not limited to an HSV histogram, and may be other types of histograms such as histogram of H and S, a histogram of luminance, and the like, for example.

Then, a grayscale image 215 having frequencies as pixel values is generated by back-projecting the calculated HSV histogram 214 onto the captured image 211. In this process, the image processing apparatus 100 determines, for each pixel of the captured image 211, the frequency corresponding to H and S values that are based on the original pixel value from the HSV histogram 214, and assigns the frequency to the position of the corresponding pixel of the captured image 211 as a pixel value. In the generated grayscale image 215, the greater the pixel value is, the greater the probability that the pixel belongs to the detection target object is. Further, the less the pixel value is, the greater the probability that the pixel belongs to the background region other than the detection target object is.

Then, the grayscale image 215 is binarized by comparing the pixel value of each pixel of the grayscale image 215 with a threshold. In the binarization processing, a value "1" is assigned to pixels having pixel values (frequencies) equal to or greater than the threshold, while a value "0" is assigned to pixels having pixel values (frequencies) less than the threshold. In this way, the grayscale image 215 is converted into a binary image. In the binary image, the region with the value "1" is assumed to be the region of the detection target object. Then, the boundary between the region with the value "1" and the region with the value "0" is extracted as the contour of the object.

Figure 5:
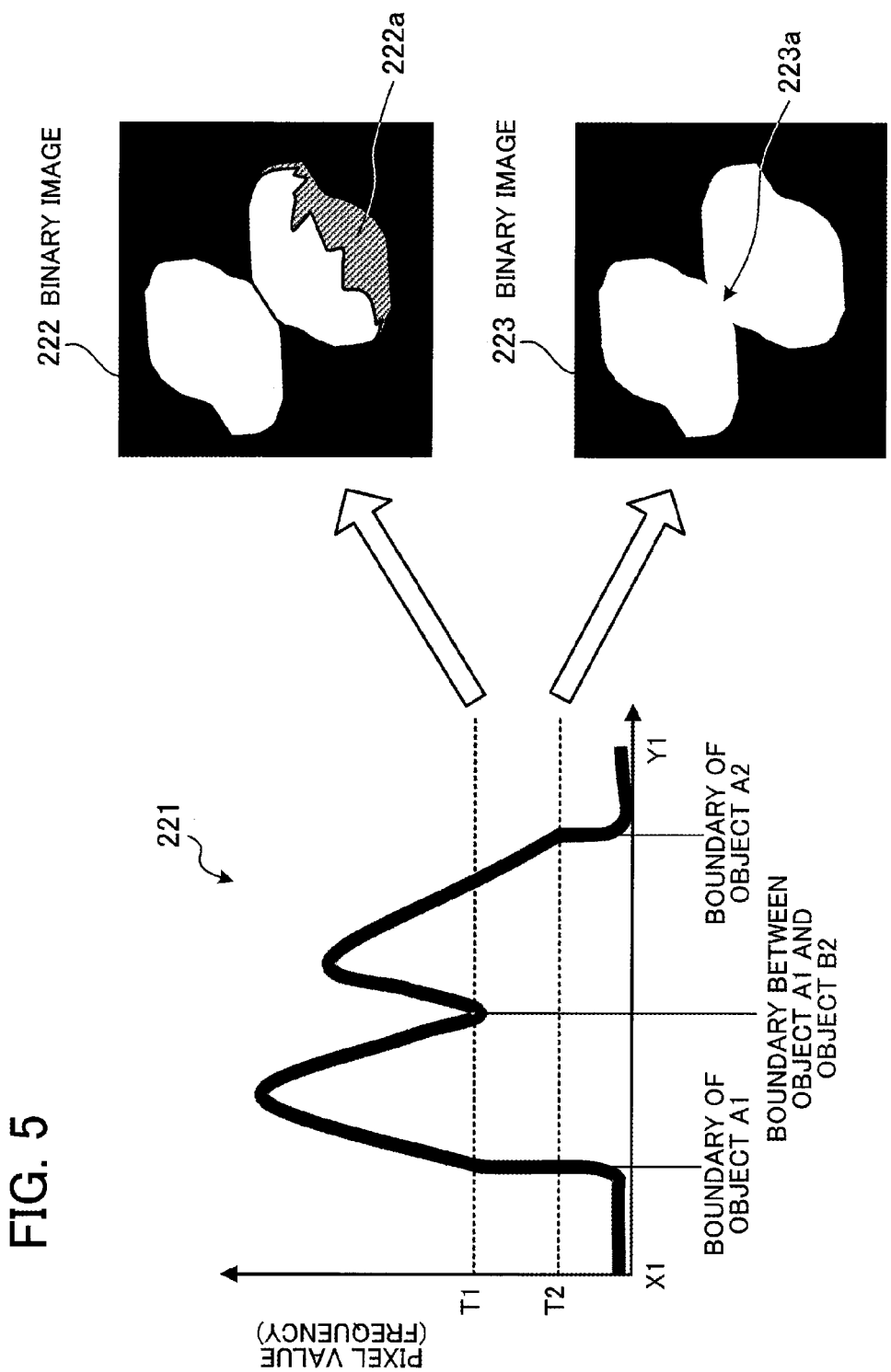
FIG. 5 illustrates an exemplary process for binarizing a grayscale image.

FIG. 5 illustrates an exemplary process for binarizing the grayscale image 215. A graph 221 of FIG. 5 represents the distribution of pixel values (frequencies) of the grayscale image 215 along a line X1-Y1 connecting a point X1 at the upper left corner and a point Y1 at the lower right corner of the grayscale image 215 of FIG. 4. In FIG. 5, two binary images 222 and 223 are also illustrated that are generated using different thresholds T1 and T2. Note that the threshold T1 is greater than the threshold T2.

As in the captured image 211 of FIG. 4, if a plurality of detection target objects are adjacent to each other, it is difficult to set a threshold that achieves accurate extraction of the contour of each object. For instance, in the case where the binary image 222 is generated using the threshold T1 having a relatively large value, the contour is detected inside the actual contour of the object, so that there might be a missing region 222a indicated by hatching in FIG. 5. On the other hand, in the case where the binary image 223 is generated using the threshold T2 having a relatively small value, the contours of the two adjacent objects might be connected at a region 223a.

The pixel values in the region of each object in the grayscale image 215 are not equal because of factors such as, for example, the shape of each object, the positional relationship with the contact position with the adjacent object, the manner in which the light from the light source is incident, and the like. Moreover, these factors vary from one object to another, and hence the distribution of pixel values in the region of each object varies from one object to another. Therefore, in the case where the grayscale image 215 is binarized using a single threshold, even if the contour of one object is accurately detected, there might be an object whose contour might be shifted inward, and there might be an object whose contour is connected to the contour of the adjacent object.

In order to address this problem, the image processing apparatus 100 of this embodiment generates a plurality of binary images from the grayscale images 215 while changing the threshold, and calculates the area of a closed region corresponding to the region of each object. Then, the image processing apparatus 100 determines an optimum one of the different thresholds, based on the area change rate of the closed region caused by changing the threshold. For example, the optimum threshold is determined by searching for a threshold with which the area of the closed region is sharply changed.

Figure 6:
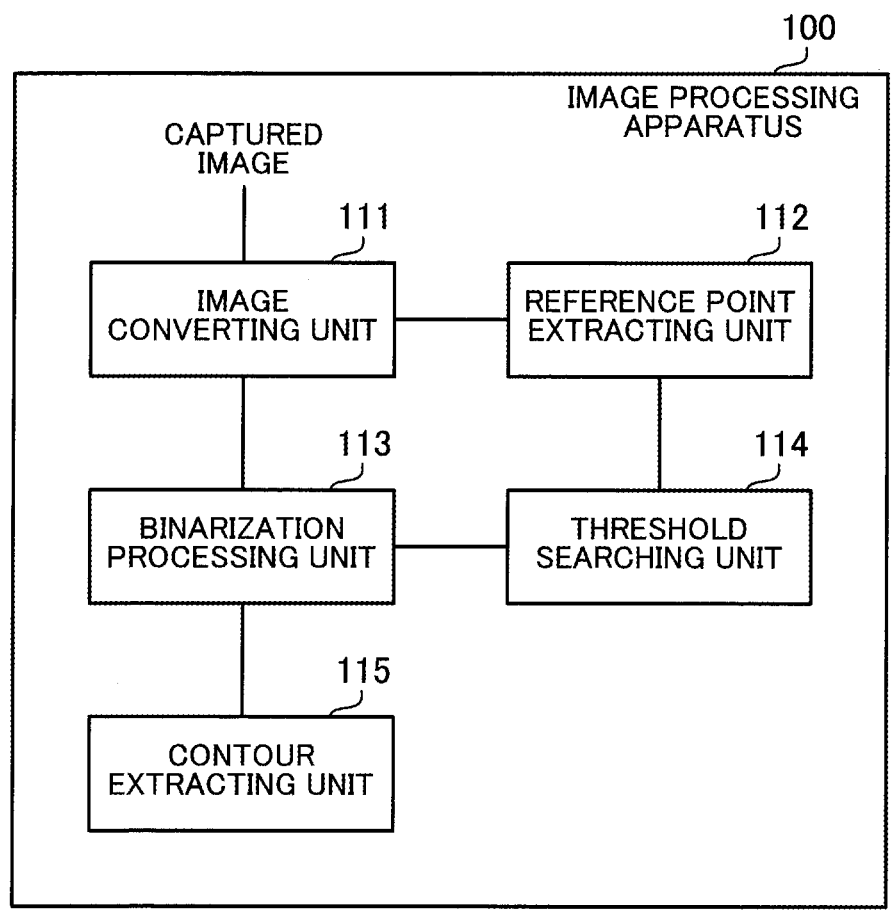
FIG. 6 illustrates an exemplary functional configuration of the image processing apparatus according to the second embodiment.

FIG. 6 illustrates an exemplary functional configuration of the image processing apparatus 100 according to the second embodiment. The image processing apparatus 100 includes an image converting unit 111, a reference point extracting unit 112, a binarization processing unit 113, a threshold searching unit 114, and a contour extracting unit 115. Operations by these units are realized when, for example, the processor 101 of the image processing apparatus 100 executes a predetermined program.

The image converting unit 111 converts a captured image representing a plurality of objects into a grayscale image having frequencies of an HSV histogram as pixel values. More specifically, the image converting unit 111 calculates an HSV histogram from the H and S values that are based on the pixel values of the captured image, and generates a grayscale image by back-projecting the HSV histogram onto the captured image.

The reference point extracting unit 112 extracts a reference point corresponding to each object, from the grayscale image. More specifically, the reference point extracting unit 112 generates a distance-converted image by performing distance conversion on the grayscale image, extracts a plurality of maximal points in the distance-converted image, and specifies the positions of the respective maximal points as reference points.

The binarization processing unit 113 binarizes each pixel of the grayscale image converted by the image converting unit 111, by comparing the pixel with a threshold, and thus generates a binary image. Regions to be subjected to binarization processing by the binarization processing unit 113 and the threshold used for binarization are specified by the threshold searching unit 114.

The threshold searching unit 114 searches for, for each reference point extracted by the reference point extracting unit 112, an optimum threshold for extracting the contour of the object corresponding to the reference point. More specifically, the threshold searching unit 114 causes the binarization processing unit 113 to generate binary images while gradually changing the threshold, and calculates the area of a closed region including a reference point in each of the generated binary images. The threshold searching unit 114 determines an optimum threshold for each reference point, based on the area change rate of the closed region caused by changing the threshold.

The contour extracting unit 115 extracts the contour of the closed region in the binary image that is generated using the threshold determined by the threshold searching unit 114. The contour extracted for a single reference point corresponds to the contour of a single object represented in the captured image.

The following describes a process performed by the image processing apparatus 100 in detail.

(Conversion to Grayscale Image)

The image converting unit 111 converts a captured image representing a plurality of objects into a grayscale image having frequencies of an HSV histogram as pixel values. The process of generating a grayscale image is described above with reference to FIG. 4. That is, the image converting unit 111 calculates an HSV histogram based on the pixel values of the captured image, and generates a grayscale image by back-projecting the HSV histogram onto the captured image.

(Extraction of Reference Points)

The reference point extracting unit 112 generates a distance-converted image by performing distance conversion on the grayscale image, and extracts a plurality of maximal points in the distance-converted image. The positions of the respective maximal points are specified as reference points.

Distance conversion is a process for converting the value of each pixel of an image including a detection target object into the shortest distance from the pixel to the background image (pixels other than the detection target object). Thus, in each pixel of a region representing the object, the distance from the contour of the object to the pixel is written. The distance conversion process includes, for example, an initialization process, distance conversion using raster scan, and distance conversion using revers raster scan.

First, the reference point extracting unit 112 performs an initialization process so as to binarize the grayscale image using a predetermined threshold. This threshold is a relatively relaxed threshold (a threshold having a relatively small value). Then, the reference point extracting unit 112 converts the obtained binary image into a first distance-converted image. The pixel values of pixels (i, j) in the binary image and the first distance-converted image are represented as p(i, j) and d1(i, j), respectively. The reference point extracting unit 112 sets, for each pixel (i, j), an arbitrary maximum value (the arbitrary maximum value is greater than 1) to the pixel value d1(i, j) if the pixel value p(i, j) is 1, and sets 0 to the pixel value d1(i, j) if the pixel value p(i, j) is 0.

Then, the reference point extracting unit 112 performs distance conversion using raster scan. The reference point extracting unit 112 converts the first distance-converted image into a second distance-converted image, by calculating the following expression (1) while performing raster scan on the thus generated first distance-converted image from the upper left corner to the lower right corner. The pixel value of a pixel (i, j) in the second distance-converted image is represented as d2(i, j). Further, "min{ . . . }" represents the smallest value among the values in { . . . }.

$$d2(i,j)=\min\{d1(i,j),d2(i-1,j)+1,d2(i,j-1)+1\} \quad (1)$$

Then, the reference point extracting unit 112 performs distance conversion using reverse raster scan. The reference point extracting unit 112 converts the second distance-converted image into a final third distance-converted image, by calculating the following expression (2) while performing reverse raster scan on the thus generated second distance-converted image from the lower right corner to the upper left corner. The pixel value of a pixel (i, j) in the third distance-converted image is represented as d(i, j).

$$d(i,j)=\min\{d2(i,j),d(i+1,j)+1,d(i,j+1)+1\} \quad (2)$$

Then, the reference point extracting unit 112 calculates, for each pixel of the thus generated distance-converted image, the position of the pixel with the maximal value among the neighboring pixels. For example, the reference point extracting unit 112 searches for, for the pixel (i, j), the position (the maximum point) with the maximum pixel value, from a region of 7 pixels by 7 pixels having its center at the pixel (i, j), and stores its pixel value (the maximum value). The reference point extracting unit 112 executes this process while performing raster scan on the distance-converted image from the upper left corner to the lower right corner of the distance-converted image. Further, if the maximum value is updated, the reference point extracting unit 112 adds the pixel with the updated maximum value as a new maximum point, and updates the stored maximum value.

The reference point extracting unit 112 performs filtering on the thus detected plurality of maximum points, excluding points having pixel values less than a predetermined threshold. Further, the reference point extracting unit 112 extracts, from the remaining maximum points, pairs of maximum points in each of which the distance between two maximum points is less than a predetermined threshold, and performs clustering while excluding one of the two maximum points which has a smaller pixel value from each of the extracted pairs. The reference point extracting unit 112 determines the thus selected maximum points as reference points.

Figure 7:
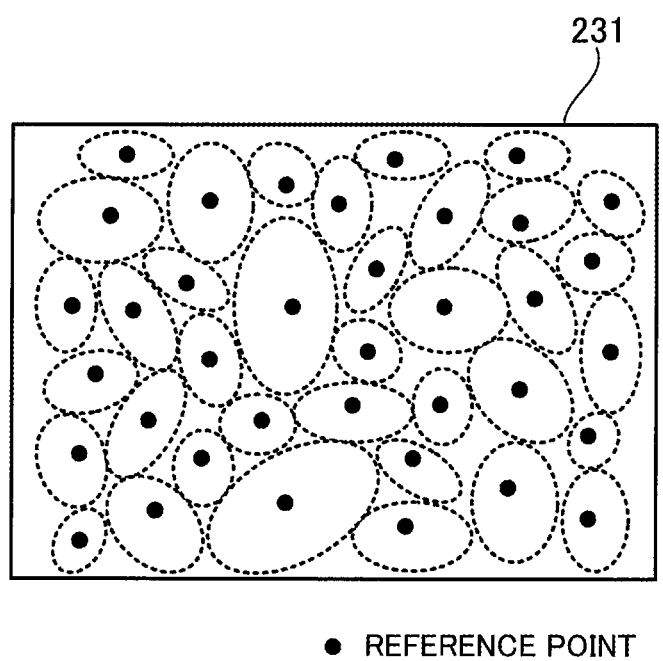
FIG. 7 illustrates an example of extraction of reference points.

FIG. 7 illustrates an example of extraction of reference points. In a grayscale image 231 of FIG. 7, the dotted lines indicate the contours of objects represented therein. With the above process, most of the extracted reference points are located inside the contours of the respective objects.

Note that the above-described method of calculating reference points is merely an example, and reference points may be calculated using, for example, a mean shift method.

(Search for Optimum Threshold and Contour Extraction)

The binarization processing unit 113 performs binarization by comparing each pixel of a grayscale image, which is converted by the image converting unit 111, with a threshold, and thereby generates a binary image. The threshold searching unit 114 causes the binarization processing unit 113 to generate binary images while gradually changing the threshold.

As mentioned above, each reference point extracted by the reference point extracting unit 112 is estimated to be located in the inner region of a detection target object. Accordingly, in the generated binary image, closed regions each including a reference point appear. Each closed region corresponds to the contour of an object corresponding to a reference point. Note that the term "closed region" refers to an adjacent region having the same pixel value as the reference point. In this embodiment, a closed region is a region including the reference point and having a pixel value "1". The threshold searching unit 114 calculates, for each reference point, the area of a closed region including the reference point, while changing the threshold.

Figure 8:
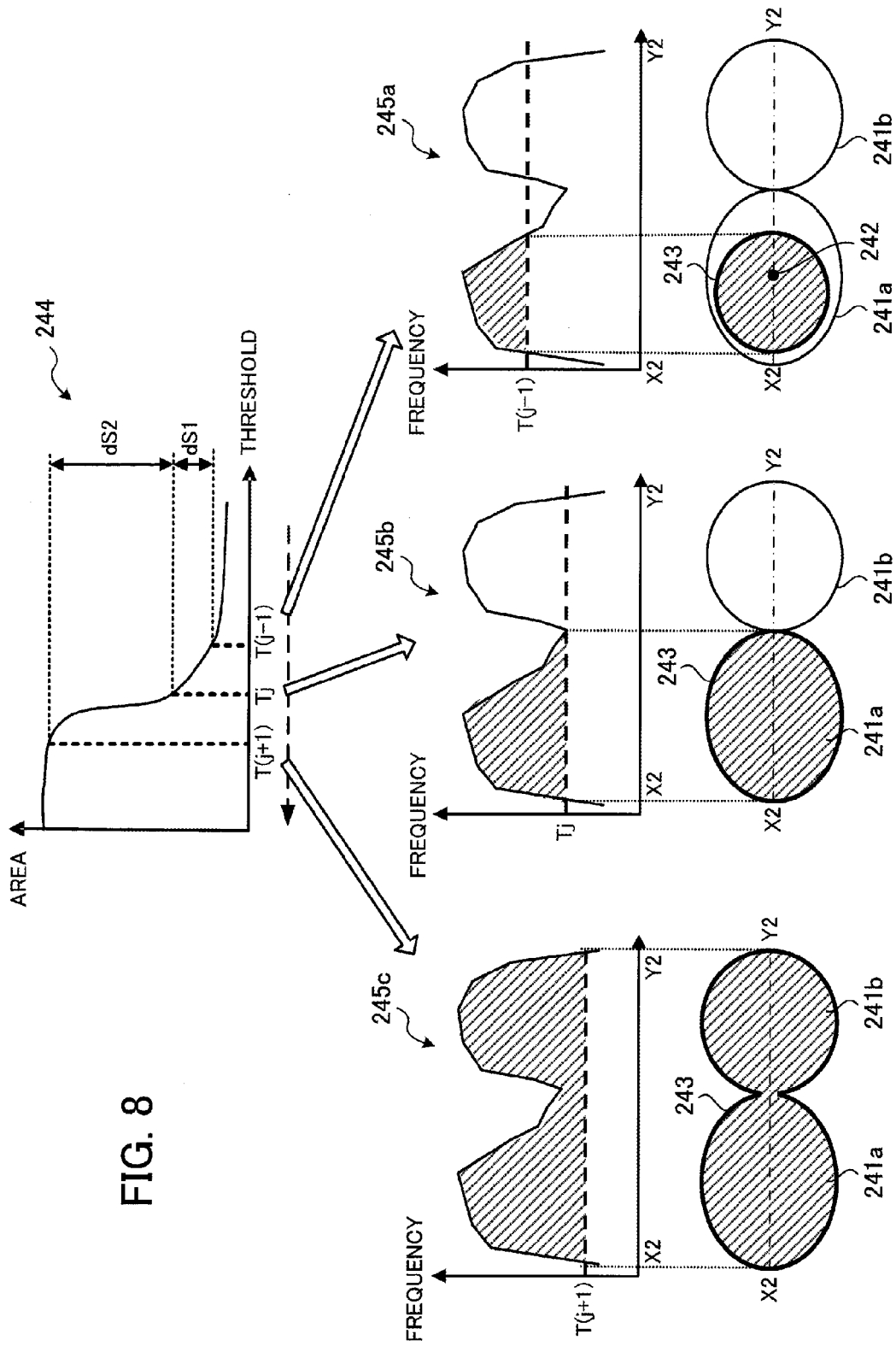
FIG. 8 illustrates an example of changes in the area of a closed region in response to changes in threshold.

FIG. 8 illustrates an example of changes in the area of a closed region in response to changes in threshold. Objects 241a and 241b illustrated in FIG. 8 are objects that are actually represented in the grayscale image. The objects 241a and 241b are adjacent to and in contact with each other. In the following, the contour of the object 241a is to be detected. Note that a reference point 242 is extracted inside the region of the object 241a. Although not illustrated herein, another reference point may be extracted inside the region of the object 241b.

When binarization is performed by comparing the pixel value of each pixel of the grayscale image with a threshold, a closed region 243 including the reference point 242 appears around the reference point 242. Further, as the threshold used for binarization changes, the shape of the closed region 243 including the same reference point 242 changes, and its area also changes.

A graph 244 illustrates an example of the relationship between changes in the threshold and changes in the area of the closed region 243 including the reference point 242. In this example, the threshold searching unit 114 gradually changes the threshold. In FIGS. 8, T(j−1), Tj, and T(j+1) indicate (j−1)-th, j-th, and (j+1)-th thresholds that are set in this order. Note that the thresholds are equally spaced. Accordingly, the difference between the areas of the closed regions extracted using two adjacent thresholds may be considered as an area change rate.

In the following, as illustrated in FIG. 8, the threshold is changed from a stringent value to a relaxed value, that is, from a large value to a small value. Each of graphs 245a through 245c represents the distribution of pixel values (frequencies) of the grayscale image along a line X2-Y2 connecting a point X2 and a point Y2 of FIG. 8.

As illustrated in the graph 244, the area of the closed region 243 increases as the threshold decreases. When the threshold is, for example, T(j−1), the closed region 243 is represented inside the actual contour of the object 241a. That is, if the boundary of this closed region 243 is extracted as the contour, the contour is shifted inward.

When the threshold decreases, for example, to Tj, the closed region 243 is enlarged, so that its area increases. In this case, the closed region 243 matches the actual contour of the object 241a.

When the threshold further decreases, for example, to T(j+1), the closed region 243 is further enlarged, so that its area increases. In this case, the closed region 243 expands to a region where the actual contour of the object 241a and the actual contour of the adjacent object 241b are connected.

During the period when the threshold gradually decreases to Tj, the closed region 243 gradually expands only within the actual contour of the object 241a. Therefore, a change rate dS1 of the area of the closed region 243 is not very large. On the other hand, when the threshold becomes less than Tj, the closed region 243 expands to a region where the actual contours of the objects 241a and 241b are connected. Therefore, a change rate dS2 of the closed region 243 increases sharply.

Accordingly, upon detecting a sharp increase in the area change rate of the closed region 243 including the reference point 242, the threshold searching unit 114 determines the threshold that is set immediately before the sharp increase in the change rate as an optimum threshold corresponding to the reference point 242.

In the example of FIG. 8, the threshold searching unit 114 calculates the area of the closed region 243 from the binary image that is generated using the threshold T(j+1), and determines a sharp increase in the area. Then, the threshold searching unit 114 determines the immediately preceding threshold Tj as an optimum threshold corresponding to the reference point 242.

The threshold searching unit 114 causes the binarization processing unit 113 to output the binary image obtained by setting the threshold Tj to the contour extracting unit 115, and causes the contour extracting unit 115 to perform contour extraction based on the closed region 243 in this binary image. The contour extracting unit 115 extracts the boundary of the closed region 243, and outputs the extracted boundary as a contour corresponding to the reference point 242. Thus, it is possible to accurately detect the contour of an object that is in contact with another object therearound.

Further, since the above-described processing by the binarization processing unit 113, the threshold searching unit 114, and the contour extracting unit 115 is performed for each reference point, contours of objects corresponding to the respective reference points are extracted.

Although not illustrated, in the case where an object to be subjected to contour extraction is not in contact with any other objects therearound, the contour of the object is extracted in the following manner. When a reference point is extracted inside the region of the object, the threshold searching unit 114 causes the binarization processing unit 113 to generate binary images while gradually reducing the threshold, in the same manner as described above. Then, a closed region including the reference point is generated, and gradually expands as the threshold decreases. However, since the object is not in contact with any other objects, the region is saturated when the closed region matches the actual contour of the object. Thus, the area change rate of the closed region becomes extremely small.

Accordingly, upon detecting the area change rate of the closed region including the reference point becoming extremely small, the threshold searching unit 114 determines the threshold that is set immediately before the area change rate became extremely small as an optimum threshold corresponding to the reference point. Thus, it is possible to accurately detect the contour of an object that is not in contact with any other objects therearound.

Figure 9:
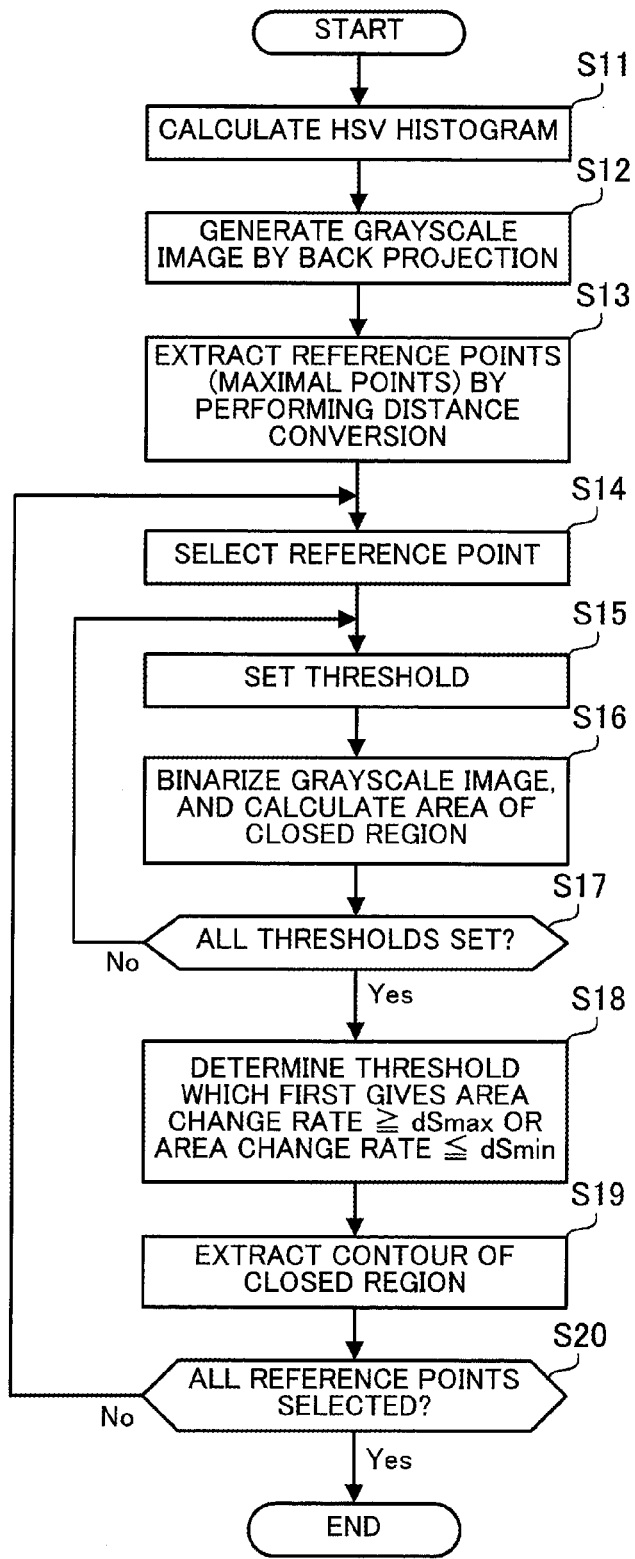
FIG. 9 is a flowchart illustrating an exemplary process performed by the image processing apparatus according to the second embodiment.

FIG. 9 is a flowchart illustrating an exemplary process performed by the image processing apparatus 100 according to the second embodiment.

(Step S11) The image converting unit 111 calculates an HSV histogram based on pixel values of a captured image.

(Step S12) The image converting unit 111 generates a grayscale image by back-projecting the HSV histogram onto the captured image.

(Step S13) The reference point extracting unit 112 generates a distance-converted image by performing distance conversion on the grayscale image, and extracts a plurality of maximal points in the distance-converted image. The reference point extracting unit 112 outputs each of the extracted maximal points as a reference point corresponding to an object. In this step, the reference point extracting unit 112 stores the coordinates of each reference point in the grayscale image in, for example, the RAM 102.

(Step S14) The threshold searching unit 114 selects one of the reference points.

(Step S15) The threshold searching unit 114 sets, for the binarization processing unit 113, a threshold for binarization processing.

As the threshold that is set in step S15, a predetermined number of gradually increasing or decreasing values are determined in advance. Thus, the processing of steps S15 through S17 is repeated the same number of times as the number of the determined thresholds. When setting a threshold for the first time after performing step S14 (that is, when setting a threshold corresponding to a reference point for the first time), the threshold having the largest value among the determined thresholds is set for the binarization processing unit 113. After that, each time "No" is determined in step S17, the process returns to step S15. In step S15, the next smaller threshold is set.

Note that the threshold that is set for the first time after step S14 is performed is determined such that the corresponding closed region in the binary image becomes smaller than the region representing the corresponding object. Such an initial value of the threshold may be, for example, an empirically determined value. Alternatively, when starting the process of FIG. 9, the operator may input a threshold so as to generate a sample binary image, and determine the initial value of the threshold by viewing the generated sample binary image. The determined threshold may be continuously used afterwards as long as imaging conditions such as, for example, the lighting environment, imaging angle, distance, image size, and type of the object to be imaged do not change.

(Step S16) The binarization processing unit 113 binarizes the grayscale image generated in step S12 using the threshold set in step S15. More specifically, the binarization processing unit 113 generates a binary image by assigning a value "1" to pixels having pixel values (frequencies) equal to or greater than the threshold, and assigning a value "0" to pixels having pixel values (frequencies) less than the threshold.

The threshold searching unit 114 calculates the area of a closed region including the reference point in the generated binary image. The closed region is an adjacent region including the reference point and having a pixel value equal to the pixel value "1" of the reference point.

(Step S17) The threshold searching unit 114 determines whether all the determined thresholds have been set. If there is a threshold that has not been set, the process returns to step S15. If all the thresholds have been set, the process proceeds to step S18.

Note that in step S16, the entire region of the grayscale image does not need to be binarized, and at least the region from which a closed region including the reference point is extracted needs to be binarized.

For example, in the case where the maximum value of the size of objects represented in a grayscale image is predictable, a rectangular region having a size slightly greater than the size that accommodates the expected largest object is determined in advance. Then, the threshold searching unit 114 specifies a rectangular region having its center at the reference point for the binarization processing unit 113, and causes the binarization processing unit 113 to perform binarization processing on the rectangular region.

In another example, when repeating steps S15 through S17 for a single reference point, the threshold searching unit 114 causes the binarization processing unit 113 to perform binarization processing on the entire grayscale image upon first execution of step S16. In this case, the threshold searching unit 114 extracts a closed region including the reference point. Then, the threshold searching unit 114 determines, based on the size of the extracted closed region, a binarization region large enough to extract a closed region, and specifies the determined binarization region when performing the subsequent step S16. Alternatively, since the area of the closed region increases each time step S16 is performed, the binarization region may be gradually increased each time step S16 is performed.

(Step S18) The threshold searching unit 114 specifies the first pair of areas which makes the area change rate equal to or greater than a predetermined maximum threshold dSmax or makes the area change rate equal to or less than a predetermined minimum threshold dSmin (dSmin<dSmax) when the areas of the closed regions calculated in step S16 are arranged in chronological order.

In the case where a pair of areas which makes the area change rate equal to or greater than the maximum threshold dSmax is determined, the threshold searching unit 114 determines a threshold that is set in the binarization processing unit 113 when calculating the first one of the areas (the chronologically first one of the areas) of the specified pair as an optimum threshold for detection of the contour of the object corresponding to the reference point. Note that, as mentioned above, the case where a pair of areas which makes the area change rate equal to or greater than the maximum threshold dSmax is determined is the case where a closed region expands to a region where the region of the actual contour of the corresponding object is connected to the region of the actual contour of an adjacent object.

Further, in the case where a pair of areas which makes the area change rate equal to or less than the minimum threshold dSmin is determined, the threshold searching unit 114 determines a threshold that is set in the binarization processing unit 113 when calculating one of the areas (for example, the second one of the areas) of the specified pair as an optimum threshold for detection of the contour of the object corresponding to the reference point. Note that, as mentioned above, the case where a pair of areas which makes the area change rate equal to or less than the minimum threshold dSmin is determined is the case where the corresponding object is not in contact with any other objects therearound and where the size of a closed region is saturated.

(Step S19) The threshold searching unit 114 causes the binarization processing unit 113 to output a binary image that is generated using the optimum threshold determined in step S18. This binary image may be the binary image generated in step S16 and representing only a binarization target region including the corresponding closed region.

The contour extracting unit 115 detects the boundary of the corresponding closed region in the binary image output from the binarization processing unit 113, and outputs the detected boundary as the contour of the object corresponding to the reference point selected in step S14.

(Step S20) The threshold searching unit 114 determines whether all the reference points extracted in step S13 have been selected. If there is any unselected reference point, the process returns to step S14. On the other hand, if all the reference points have been selected, the process ends. Note that, in the latter case, the image processing apparatus 100 may calculate the area of each object in the captured image, based on the extracted contour of each object. Further, the image processing apparatus 100 may calculate the estimated weight of each object, based on the calculated area of each object.

According to the second embodiment described above, even if an object to be subjected to contour detection is in contact with another object therearound in a captured image, it is possible to accurately detect the contour of the object. Further, even if there is an object that is not in contact with any other objects therearound in the captured image, it is possible to accurately detect the contour of the object.

Note that in the above-described second embodiment, reference points corresponding to respective objects are first extracted, and the area change rate of a closed region is calculated for each reference point. However, an optimum threshold may be calculated by evaluating the area change rate, for each set of corresponding closed regions between the binary images that are generated while changing the threshold, without using a reference point. The term "corresponding closed regions" as used herein refers to closed regions having an overlap, for example.

However, the way the closed region changes with changes in the threshold varies depending on the conditions such as the manner in which the light is incident on each object and the like. Therefore, it may be difficult to determine corresponding closed regions between the binary images. In view of this, as described above, reference points (maximal points) corresponding to respective objects are extracted, and the area change rate of the closed region is calculated for each of the reference points. Thus, it is possible to accurately estimate the closed region corresponding to each object. Accordingly, it is possible to increase the accuracy of contour detection.

Further, upon extracting the contour of the closed region in step S19, the contour extracting unit 115 may calculate either one of (or both) the circularity and the aspect ratio of the contour, and determine whether the calculated value is within a predetermined threshold range. If the calculated value is out of the predetermined threshold range, the contour of the target object might not be accurately detected. Accordingly, the image processing apparatus 100 performs processing of steps S15 through S19 for the corresponding reference point. In this case, for example, the interval between the thresholds that are set in step S15 may be reduced or the range of the thresholds that are set may be changed. Thus, it is possible to accurately detect the target object, and to increase the detection accuracy of its contour.

(c) Third Embodiment

In the above-described second embodiment, the area change rate of a closed region is calculated for each reference point, and an optimum threshold is determined for each reference point. The following third embodiment is a modification of the second embodiment. More specifically, in the third embodiment, the area change rate of a closed region is calculated for each of sub-regions divided along a plurality of dividing lines passing through a reference point. With this method, it is possible to accurately detect the contour of each object, even if there is a variation in the manner in which the illumination is incident on the objects represented in the captured image.

Figure 10:
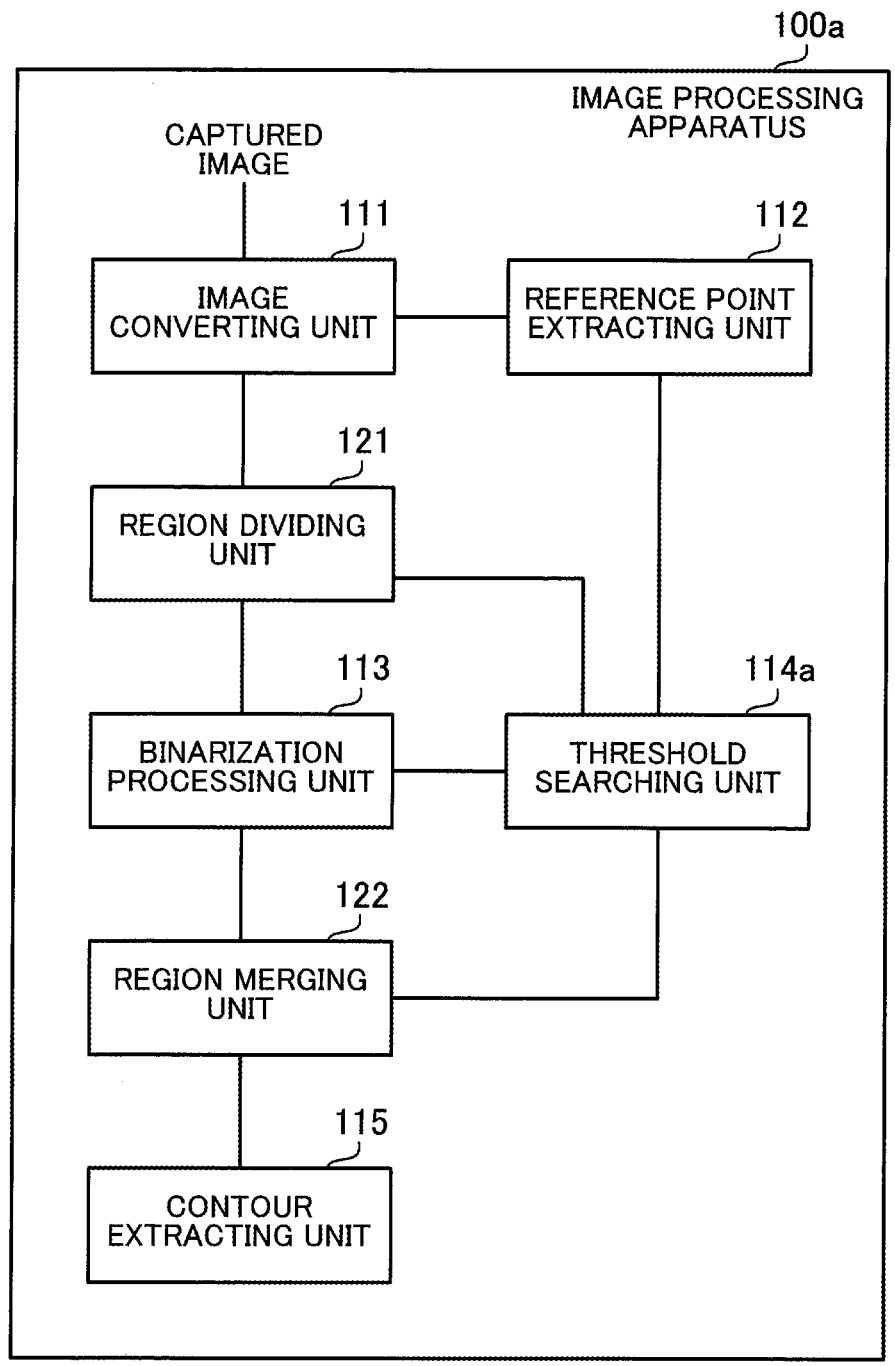
FIG. 10 illustrates an exemplary functional configuration of an image processing apparatus according to a third embodiment.

FIG. 10 illustrates an exemplary functional configuration of an image processing apparatus 100a according to the third embodiment. Note that, in FIG. 10, processing blocks that perform the same operations as those in FIG. 6 are denoted by the same reference numerals, and a description thereof will be omitted.

The image processing apparatus 100a of the third embodiment includes an image converting unit 111, a reference point extracting unit 112, a binarization processing unit 113, and a contour extracting unit 115, as in the case of the second embodiment. Further, the image processing apparatus 100a includes a threshold searching unit 114a in place of the threshold searching unit 114 of the second embodiment, a region dividing unit 121, and a region merging unit 122. Operations by these units are realized when, for example, the processor 101 of the image processing apparatus 100a executes a predetermined program.

The region dividing unit 121 divides a surrounding region of each reference point into a plurality of sub-regions, for each reference point extracted by the reference point extracting unit 112.

As in the case of the second exemplary embodiment, the threshold searching unit 114a causes the binarization processing unit 113 to generate binary images while gradually changing the threshold. However, the threshold searching unit 114a determines an optimum threshold to be used for binarization for detecting the contour of the closed region corresponding to the reference point, not for each reference point, but for each sub-region.

Thus, a closed region is generated using the optimum threshold, for each of the sub-regions generated around a single reference point. The region merging unit 122 merges these closed regions so as to convert the closed regions into a closed region corresponding to the single reference point. Then, based on the converted closed region, a contour corresponding to the object is detected by the contour extracting unit 115.

Figure 11:
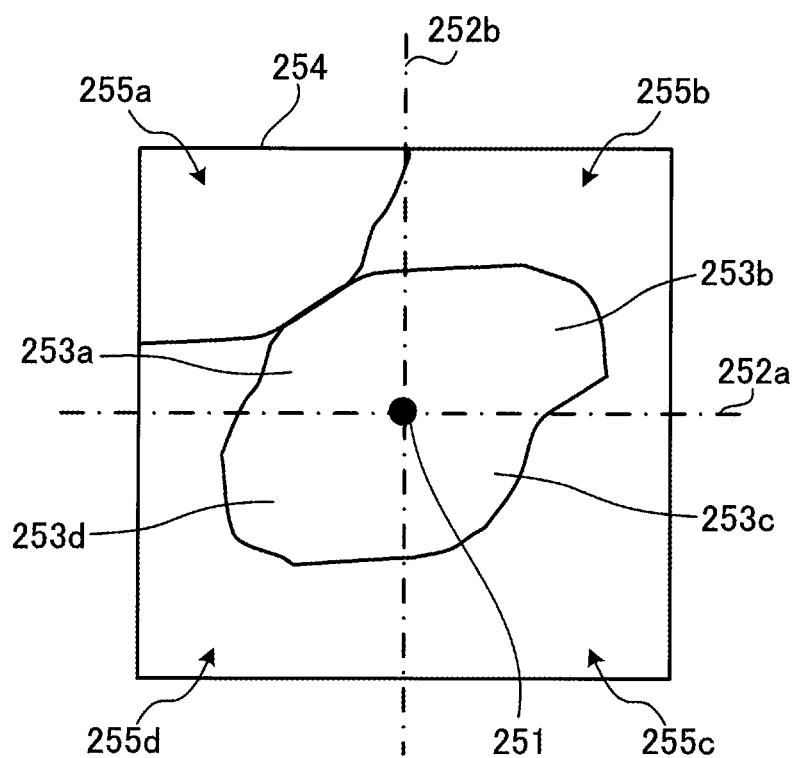
FIG. 11 illustrates an example of a method of setting sub-regions.

FIG. 11 illustrates an example of a method of setting sub-regions. The region dividing unit 121 divides a surrounding region of each reference point along a plurality of dividing lines passing through the reference point. Thus, sub-regions are radially formed around the reference point. Then, the threshold searching unit 114a calculates, for each sub-region, the area change rate of a closed region while changing a threshold for binarization, and determines an optimum threshold for each sub-region.

In the example of FIG. 11, a surrounding region of a reference point 251 is divided into four sub-regions along two dividing lines 252a and 252b passing through the reference point 251. Accordingly, a closed region including the reference point 251 in the binary image is also divided into four regions along the dividing lines 252a and 252b.

Each of regions obtained by dividing a closed region along dividing lines is hereinafter referred to as a partial closed region. Each partial closed region is an adjacent region which is in contact with the two dividing lines and a reference point located at the intersection of the two dividing lines, and which has the same pixel value "1" as the reference point. In the example of FIG. 11, by dividing along the dividing lines 252a and 252b, a partial closed region 253a is formed at the upper left of the reference point 251; a partial closed region 253b is formed at the upper right; a partial closed region 253c is formed at the lower right; and a partial closed region 253d is formed at the lower left.

Note that, a binarization region 254 of FIG. 11 is a binarization target region corresponding to the reference point 251. That is, the binarization region 254 corresponds to a region that is binarized in step S16 of FIG. 9. The threshold searching unit 114a divides the binarization region 254 into partial binarization regions 255a through 255d corresponding to sub-regions, and causes the binarization processing unit 113 to perform binarization processing for each of the partial binarization regions 255a through 255d, for example.

Note that, each time the threshold used for binarization is changed, each of the partial binarization regions 255a through 255d may be changed in accordance with the size of a partial closed region represented therein. That is, the size of the partial binarization region may be set to be large enough to accommodate the corresponding partial closed region, for each sub-region.

Figure 12:
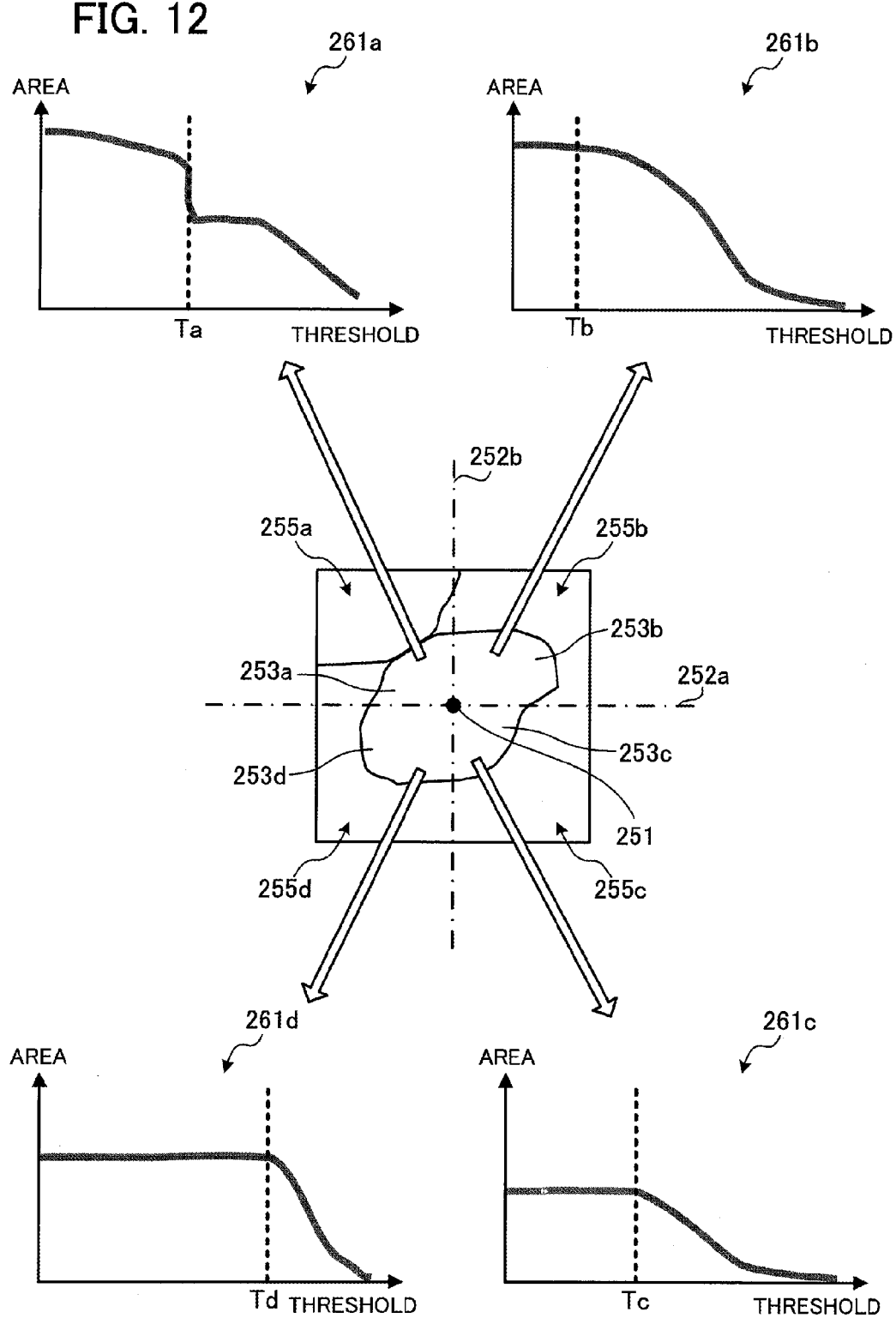
FIG. 12 illustrates an example of changes in the area of each partial closed region in response to changes in threshold.
Figure 13:
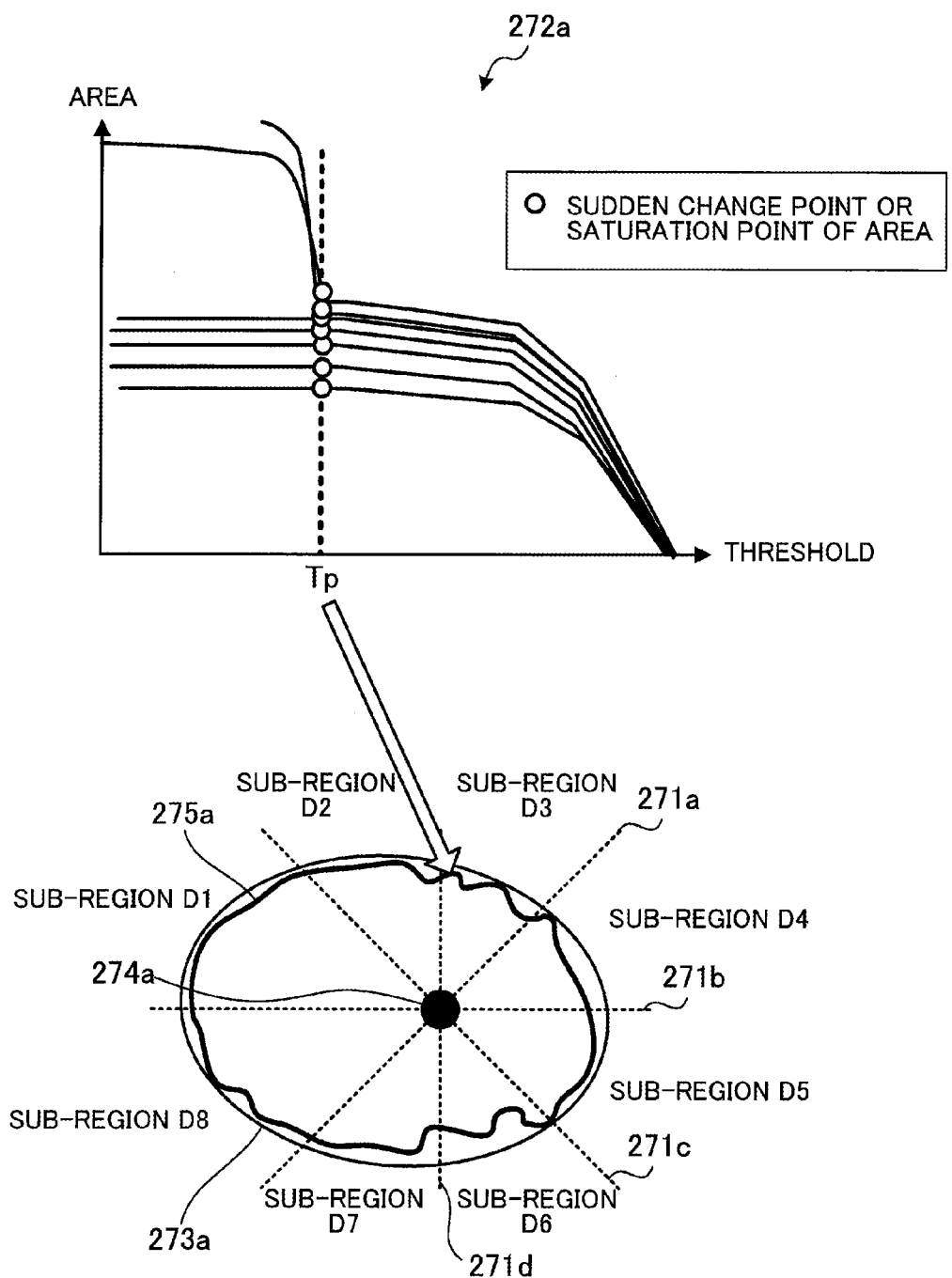
FIG. 13 illustrates an example of a closed region in the case where an illuminating light is incident on an object from the front.
Figure 14:
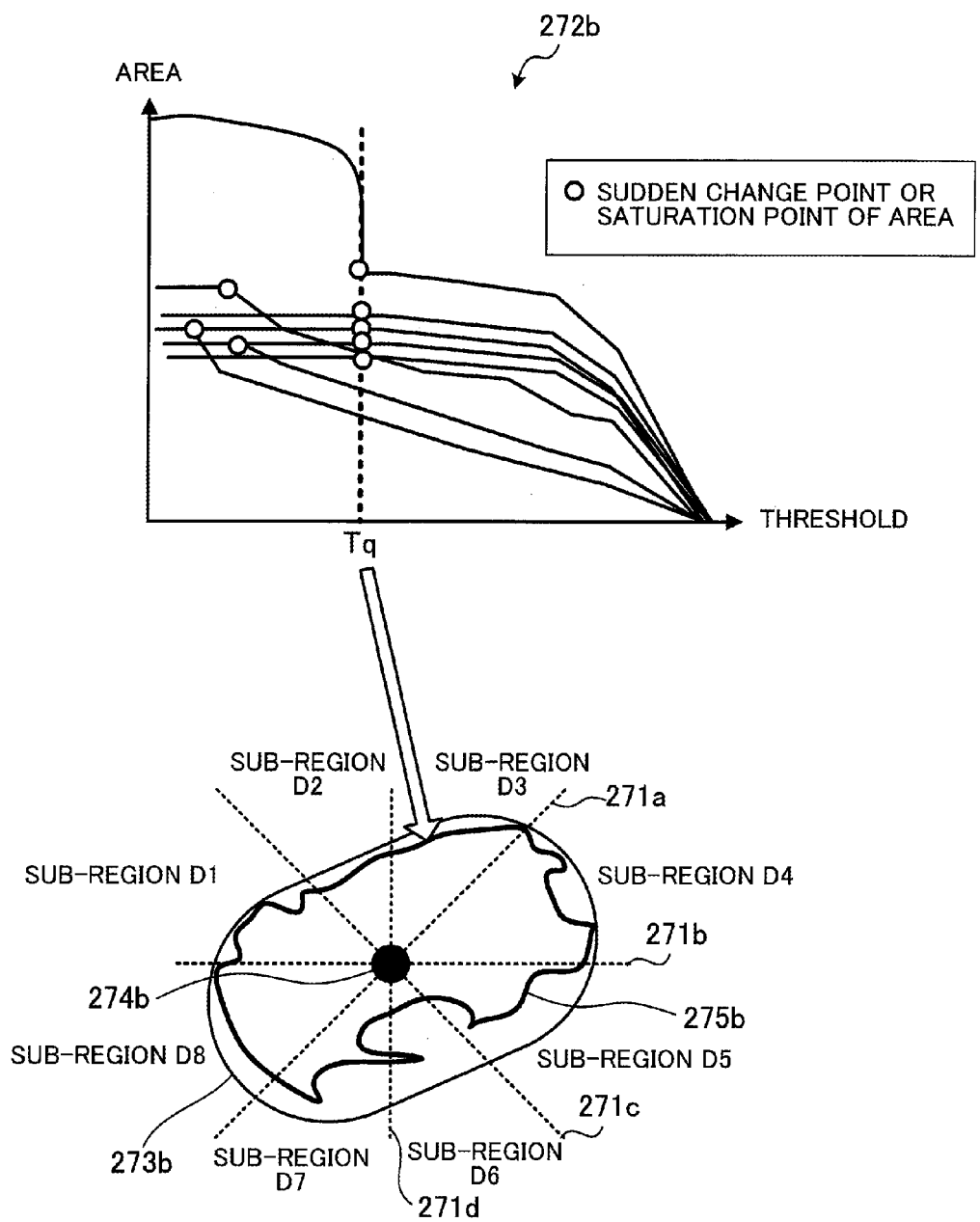
FIG. 14 illustrates an example of a closed region in the case where an illuminating light is obliquely incident on an object.

The following describes the significance of determining an optimum threshold for each sub-region with reference to FIGS. 12 through 14.

FIG. 12 illustrates an example of changes in the area of each partial closed region in response to changes in the threshold. In FIG. 12, it is assumed that the partial closed regions 253a through 253d are formed from the partial binarization regions 255a through 255d, respectively, by binarization processing. Graphs 261a through 261d represent changes in the area of the partial closed regions 253a through 253d, respectively, when changing the threshold individually for each of the partial binarization regions 255a through 255d.

The optimum thresholds of the partial binarization regions 255a through 255d are indicated by Ta through Td, respectively. These optimum thresholds Ta through Td are obtained by performing, for each of the partial closed regions 253a through 253d, the same determination as that performed in step S18 of FIG. 9.

As illustrated in these graphs 261a through 261d, the optimum thresholds determined for the partial binarization regions for optimizing partial closed regions that appear therein often differ from each other. For example, the optimum threshold Tb for the partial binarization region 255b is less than the threshold Ta for the partial binarization region 255a. Therefore, for example, if the partial binarization region 255b is binarized using the threshold Ta of the partial binarization region 255a, the contour might be shifted inward. Further, in each of the partial binarization regions 255b through 255d, the detection target object is not in contact with any other objects. However, the optimum thresholds Tb through Td corresponding to the respective partial binarization regions 255b through 255d differ from each other.

A major factor for the difference in the threshold between the partial binarization regions is that the manner in which the illumination is incident on the represented object differs between the partial binarization regions. For example, it is assumed that an illuminating light source is located substantially in the same position as the imaging apparatus when an image of a large number of objects is captured as illustrated in FIG. 3. In this case, the illuminating light is incident from the front onto the object represented in the center of the captured image. On the other hand, the closer to the corner of the captured image the object is located, the greater the inclination of the irradiation angle of the illuminating light becomes.

The following describes examples of closed regions in accordance with the manner in which the illuminating light is incident. FIG. 13 illustrates an example of a closed region in the case where an illuminating light is incident on an object from the front. FIG. 14 illustrates an example of a closed region in the case where an illuminating light is obliquely incident on an object.

In both FIGS. 13 and 14, a surrounding region of a reference point is divided into eight sub-regions D1 through D8 along four dividing lines 271a through 271d passing through the reference point. Further, a graph 272a of FIG. 13 represents changes in the area of each of partial closed regions that are formed when binarization is performed while changing the threshold. The binarization is performed for each of the sub-regions D1 through D8 obtained by dividing a surrounding region of a reference point 274a extracted inside an object 273a. Similarly, a graph 272b of FIG. 14 represents changes in the area of each of partial closed regions that are formed when binarization is performed while changing the threshold. The binarization is performed for each of the sub-regions D1 through D8 obtained by dividing a surrounding region of a reference point 274b extracted inside an object 273b.

In the example of FIG. 13, the illuminating light is incident on the object 273a substantially from the front. Therefore, the reflection light of the illuminating light is attenuated uniformly at every angle from the reference point 274a to the contour 273a. In this case, as represented in the graph 272a of FIG. 13, the optimum thresholds determined for the respective sub-regions D1 through D8 have substantially the same value (Tp).

A contour 275a illustrated in the lower side of FIG. 13 is the contour of a closed region obtained by binarizing a grayscale image with the threshold Tp, using the method of the second embodiment. The contour 275a is slightly shifted inward, but is extracted substantially along the actual contour of the object 273a. In this example of FIG. 13, since the illuminating light is incident from the front, there is not a great difference in contour detection accuracy between the case where the optimum thresholds calculated for the respective sub-regions are used and the case where a single optimum threshold calculated for the entire surrounding region of the reference point 274a is used.

On the other hand, in the example of FIG. 14, the illuminating light is incident on the object 273b from, for example, the upper left. Therefore, the manner in which the reflection light of the illuminating light is attenuated from the reference point 274b to the contour of the object 273b varies depending on the angle. For example, in a direction from the reference point 274b to the upper left, the light is first gradually attenuated and then is sharply attenuated toward the contour of the object 273b. On the other hand, in a direction from the reference point 274b to the lower right, the light is immediately sharply attenuated.

In this case, as represented in the graph 272b of FIG. 14, some of the optimum thresholds determined for the respective sub-regions D1 through D8 may have substantially the same value (Tq). However, not all the optimum thresholds have the same value.

A contour 275b illustrated in the lower side of FIG. 14 is the contour of a closed region obtained by binarizing a grayscale image with the threshold Tq, using the method of the second embodiment. The contour 275b is substantially along the actual contour of the object 273b at the upper side and the left side of the reference point 274b. However, the contour 275b is displaced inward from the actual contour of the object 273b at the lower right of the reference point 274b, resulting in a large inward shift of the contour.

As in the examples of FIGS. 13 and 14, in the case where the contour is detected using a single optimum threshold for the entire surrounding region of the reference point, the contour might not be accurately detected due to the difference in the illumination conditions, such as the incident angle of the illuminating light and the like, in accordance with the position of the captured object. On the other hand, the image processing apparatus 100a of this embodiment performs binarization using optimum thresholds calculated for the respective sub-regions, and outputs optimum partial closed regions. Then, the image processing apparatus 100a merges, for each reference point, the output plurality of partial closed regions to form a single closed region, and extracts the contour of the formed closed region. Thus, the contour detection accuracy is improved.

Figure 15:
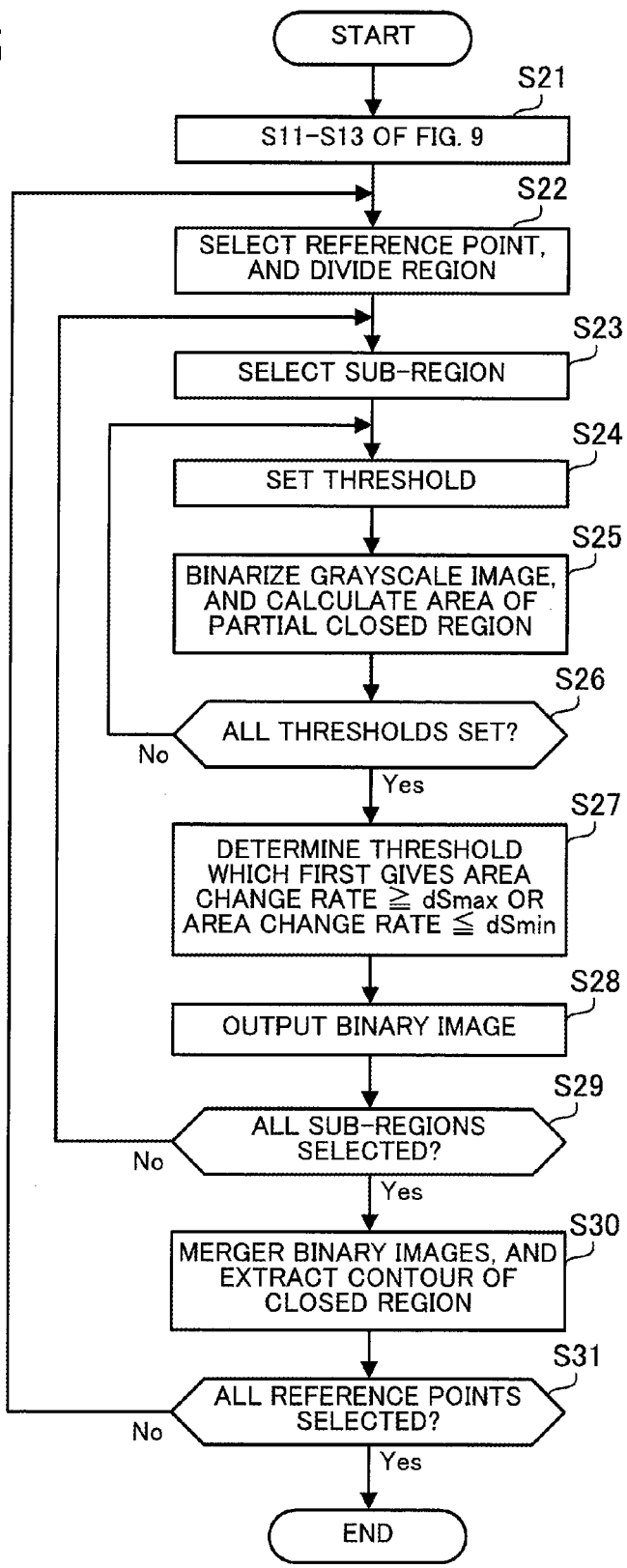
FIG. 15 is a flowchart illustrating an exemplary process performed by the image processing apparatus according to the third embodiment.

FIG. 15 is a flowchart illustrating an exemplary process performed by the image processing apparatus 100a according to the third embodiment.

(Step S21) The same processing as that of steps S11 through S13 of FIG. 9 is performed. More specifically, the image converting unit 111 calculates an HSV histogram based on the pixel values of a captured image, and generates a grayscale image by back-projecting the HSV histogram onto the captured image. The reference point extracting unit 112 generates a distance-converted image by performing distance conversion on the grayscale image, extracts a plurality of maximal points in the distance-converted image as reference points.

(Step S22) The threshold searching unit 114a selects one of the reference points. The region dividing unit 121 divides a surrounding area of the selected reference point into sub-regions along predetermined two or more dividing lines.

(Step S23) The threshold searching unit 114a selects one of the sub-regions divided by the region dividing unit 121.

(Step S24) The threshold searching unit 114 sets, for the binarization processing unit 113, a threshold for binarization processing.

The processing of steps S24 through S26 is repeated the same number of times as the number of the determined thresholds. When setting a threshold for the first time after performing step S23 (that is, when setting a threshold corresponding to a sub-region for the first time), the threshold having the largest value among the determined thresholds is set for the binarization processing unit 113. After that, each time "No" is determined in step S26, the process returns to step S24. In Step S24, the next smaller threshold is set.

(Step S25) The binarization processing unit 113 binarizes the grayscale image generated in step S21 using the threshold set in step S24. More specifically, the binarization processing unit 113 generates a binary image by assigning a value "1" to pixels having pixel values (frequencies) equal to or greater than the threshold, and assigning a value "0" to pixels having pixel values (frequencies) less than the threshold.

The threshold searching unit 114a calculates the area of a partial closed region including the reference point in the generated binary image.

Note that the binarization target region that is set in step S25 may be, for example, a partial binarization region described with reference to FIG. 11. This binary target region is set by the threshold searching unit 114a for the binarization processing unit 113.

(Step S26) The threshold searching unit 114a determines whether all the determined thresholds have been set. If there is a threshold that has not been set, the process returns to step S24. If all the thresholds have been set, the process proceeds to step S27.

(Step S27) The threshold searching unit 114a specifies the first pair of areas which makes the area change rate equal to or greater than a predetermined maximum threshold dSmax or makes the area change rate equal to or less than a predetermined minimum threshold dSmin (dSmin<dSmax) when the areas of the partial closed regions calculated in step S25 are arranged in chronological order. Then, the threshold searching unit 114a determines an optimum threshold, based on the determined pair of areas.

This operation for determining an optimum threshold in step S27 is the same as that of step S18 of FIG. 9, except that the area of the partial closed region is calculated instead of the area of the entire closed region.

(Step S28) The threshold searching unit 114a causes the binarization processing unit 113 to output a binary image that is generated using the optimum threshold determined in step S27. This binary image may be the binary image generated in step S25 and representing only the binarization target region including the corresponding partial closed region.

(Step S29) The threshold searching unit 114a determines whether all the sub-regions divided in step S23 have been selected. If there is any unselected sub-region, the process returns to step S23. If all the thresholds have been selected, the process proceeds to step S30.

(Step S30) The binary images of the respective sub-regions corresponding to a single reference position and binarized by the binarization processing unit 113 are input to the region merging unit 122. The region merging unit 122 merges these binary images to generate a binary image including the surrounding region of the corresponding reference point, under the control of the threshold searching unit 114a. Thus, the partial closed regions generated in the binary images corresponding to the respective sub-regions are merged into a single closed region.

The contour extracting unit 115 detects the boundary of the merged closed region, and outputs the detected boundary as the contour of the object corresponding to the reference point selected in step S22.

(Step S31) The threshold searching unit 114a determines whether all the reference points extracted in step S21 have been selected. If there is any unselected reference point, the process returns to step S22. On the other hand, if all the reference points have been selected, the process ends. Note that, in the latter case, the image processing apparatus 100a may calculate the area of each object in the captured image, based on the extracted contour of each object. Further, the image processing apparatus 100a may calculate the estimated weight of each object, based on the calculated area of each object.

According to the third embodiment described above, even if the illuminating light is not uniformly incident on the objects represented in the captured image, it is possible to accurately detect the contour of each of the objects.

Further, as in the case of the second embodiment, upon extracting the contour of the closed region in step S30, the contour extracting unit 115 may calculate either one of (or both) the circularity and the aspect ratio of the contour, and determine whether the calculated value is within a predetermined threshold range. If the calculated value is out of the predetermined threshold range, the contour of the target object might not be accurately detected. Accordingly, the image processing apparatus 100a performs processing of steps S23 through S30 for the corresponding reference point. In this case, for example, the interval of the thresholds that are set in step S24 may be reduced or the range of the thresholds that are set may be changed. Thus, it is possible to accurately detect the target object, and to increase the detection accuracy of its contour.

Note that the processing functions of the apparatuses (the image processing apparatuses 1, 100, and 100*a*) of the above embodiments may be implemented on a computer. In this case, a program describing operations of the functions of each apparatus is provided. When the program is executed by a computer, the above-described processing functions are implemented on the computer. The programs describing operations of the functions may be stored in a computer-readable storage medium. Examples of computer-readable storage media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include digital versatile disc (DVD), DVD-RAM, compact disc read only memory (CD-ROM), CD-Recordable (CD-R), CD-Rewritable (CD-RW), and the like. Examples of magneto-optical storage media include magneto-optical disk (MO) and the like.

For distributing the program, the program may be stored and sold in the form of a portable storage medium such as DVD, CD-ROM, and the like, for example. Further, the program may be stored in a storage device of a server computer so as to be transmitted from the server computer to other computers via a network.

For executing the program on a computer, the computer stores the program recorded on the portable storage medium or the program transmitted from the server computer in its storage device. Then, the computer reads the program from its storage device, and performs processing in accordance with the program. The computer may read the program directly from the portable storage medium, and execute processing in accordance with the program. Further, the computer may sequentially receive the program from a server computer connected over a network, and perform processing in accordance with the received program.

According to an aspect, it is possible to accurately detect the contour of each of a plurality of objects.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing apparatus comprising:
   a processor configured to perform a procedure including:
   generating a plurality of binary images by performing a binary image generation process while changing a predetermined binarization threshold, the binary image generation process being a process of generating a binary image by comparing a visual feature of each pixel of an image representing a plurality of objects with the binarization threshold and binarizing a value of each pixel of the image based on a result of the comparing,
   calculating an area of a corresponding closed region, the corresponding closed region being a closed region represented in each of the plurality of binary images and having an overlap between the plurality of binary images,
   determining the binarization threshold to be used for detecting a boundary of the corresponding closed region as a contour of an object, based on an area change rate of the corresponding closed region caused by changing the binarization threshold, and
   detecting a boundary of a first corresponding closed region as the contour of the object, the first corresponding closed region being represented in a binary image generated by using the determined binarization threshold among the plurality of binary images.

2. The image processing apparatus according to claim 1, wherein:
   the generating a plurality of binary images includes changing the binarization threshold such that the corresponding closed region is gradually enlarged; and
   the determining includes, when the area change rate of the corresponding closed region becomes equal to or greater than a predetermined maximum threshold between two binary images that are consecutively generated while changing the binarization threshold, detecting a boundary of the corresponding closed region in a preceding one of the two binary images as the contour of the object.

3. The image processing apparatus according to claim 2, wherein the procedure further includes, when the area change rate of the corresponding closed region becomes less than a predetermined minimum threshold between the two binary images, the minimum threshold being less than the maximum threshold, detecting a boundary of the corresponding closed region in either one of the two binary images as the contour of the object.

4. The image processing apparatus according to claim 1, wherein:
   the procedure further includes generating a visual feature image, by back-projecting a frequency of a value that is based on the pixel value of each pixel of the image onto the pixel of the image; and
   the generating a plurality of binary images includes generating the binary image by comparing a value of each pixel of the visual feature image with the binarization threshold.

5. The image processing apparatus according to claim 4, wherein:
   the procedure further includes performing distance conversion on the visual feature image, and extracting maximal points in an image obtained by the distance conversion as reference points of the respective objects; and
   the calculating includes calculating, as the area of the corresponding closed region, areas of closed regions represented in the respective plurality of binary images and including a same one of the reference points.

6. The image processing apparatus according to claim 1, wherein:
   the procedure further includes extracting reference points of the respective objects, based on the visual feature of each pixel in the image; and
   the calculating includes calculating, as the area of the corresponding closed region, areas of closed regions represented in the respective plurality of binary images and including a same one of the reference points.

7. The image processing apparatus according to claim 6, wherein the determining includes:

dividing a surrounding region of the reference point into a plurality of sub-regions, calculating an area of a partial closed region, the partial closed region being represented in each of the sub-regions and forming a part of the corresponding closed region, and determining, for each sub-region, the binarization threshold to be used for detecting a boundary of the partial closed region as a part of the contour of the object, based on an area change rate of the partial closed region caused by changing the binarization threshold.

8. An image processing method comprising:

generating a plurality of binary images by performing a binary image generation process while changing a predetermined binarization threshold, the binary image generation process being a process of generating a binary image by comparing a visual feature of each pixel of an image representing a plurality of objects with the binarization threshold and binarizing a value of each pixel of the image based on a result of the comparing;

calculating an area of a corresponding closed region, the corresponding closed region being a closed region represented in each of the plurality of binary images and having an overlap between the plurality of binary images;

determining the binarization threshold to be used for detecting a boundary of the corresponding closed region as a contour of an object, based on an area change rate of the corresponding closed region caused by changing the binarization threshold; and detecting a boundary of a first corresponding closed region as the contour of the object, the first corresponding closed region being represented in a binary image generated by using the determined binarization threshold among the plurality of binary images.

9. The image processing method according to claim 8, wherein:

the generating a plurality of binary images includes changing the binarization threshold such that the corresponding closed region is gradually enlarged; and the determining includes, when the area change rate of the corresponding closed region becomes equal to or greater than a predetermined maximum threshold between two binary images that are consecutively generated while changing the binarization threshold, detecting a boundary of the corresponding closed region in a preceding one of the two binary images as the contour of the object.

10. The image processing method according to claim 9, further comprising:

when the area change rate of the corresponding closed region becomes less than a predetermined minimum threshold between the two binary images, the minimum threshold being less than the maximum threshold, detecting a boundary of the corresponding closed region in either one of the two binary images as the contour of the object.

11. The image processing method according to claim 8, further comprising:

generating a visual feature image, by back-projecting a frequency of a value that is based on the pixel value of each pixel of the image onto the pixel of the image;

wherein the generating a plurality of binary images includes generating the binary image by comparing a value of each pixel of the visual feature image with the binarization threshold.

12. The image processing method according to claim 11, further comprising:

performing distance conversion on the visual feature image, and extracting maximal points in an image obtained by the distance conversion as reference points of the respective objects;

wherein the calculating includes calculating, as the area of the corresponding closed region, areas of closed regions represented in the respective plurality of binary images and including a same one of the reference points.

13. The image processing method according to claim 8, further comprising:

extracting reference points of the respective objects, based on the visual feature of each pixel in the image;

wherein the calculating includes calculating, as the area of the corresponding closed region, areas of closed regions represented in the respective plurality of binary images and including a same one of the reference points.

14. The image processing method according to claim 13, wherein the determining includes:

dividing a surrounding region of the reference point into a plurality of sub-regions, calculating an area of a partial closed region, the partial closed region being represented in each of the sub-regions and forming a part of the corresponding closed region, and determining, for each sub-region, the binarization threshold to be used for detecting a boundary of the partial closed region as a part of the contour of the object, based on an area change rate of the partial closed region caused by changing the binarization threshold.

15. A non-transitory computer-readable storage medium storing a computer program for image processing, the computer program causing a computer to perform a procedure comprising:

generating a plurality of binary images by performing a binary image generation process while changing a predetermined binarization threshold, the binary image generation process being a process of generating a binary image by comparing a visual feature of each pixel of an image representing a plurality of objects with the binarization threshold and binarizing a value of each pixel of the image based on a result of the comparing;

calculating an area of a corresponding closed region, the corresponding closed region being a closed region represented in each of the plurality of binary images and having an overlap between the plurality of binary images;

determining the binarization threshold to be used for detecting a boundary of the corresponding closed region as a contour of an object, based on an area change rate of the corresponding closed region caused by changing the binarization threshold; and detecting a boundary of a first corresponding closed region as the contour of the object, the first corresponding closed region being represented in a binary image generated by using the determined binarization threshold among the plurality of binary images.

* * * * *